US011818063B2

(12) United States Patent
Matsuo et al.

(10) Patent No.: US 11,818,063 B2
(45) Date of Patent: *Nov. 14, 2023

(54) WIRELESS COMMUNICATION DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryoko Matsuo, Tokyo (JP); Tomoya Tandai, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,584

(22) Filed: Dec. 20, 2021

(65) Prior Publication Data
US 2022/0116164 A1   Apr. 14, 2022

Related U.S. Application Data

(63) Continuation of application No. 15/918,295, filed on Mar. 12, 2018, now Pat. No. 11,228,408.

(30) Foreign Application Priority Data

Mar. 15, 2017   (JP) ................... 2017-050186

(51) Int. Cl.
*H04L 5/00*   (2006.01)
*H04B 7/0452*   (2017.01)
(Continued)

(52) U.S. Cl.
CPC ......... *H04L 5/0035* (2013.01); *H04B 7/0452* (2013.01); *H04B 7/0697* (2013.01);
(Continued)

(58) Field of Classification Search
CPC .................................................. H04L 5/0035
See application file for complete search history.

(56) References Cited

U.S. PATENT DOCUMENTS

2012/0163235 A1\* 6/2012 Ho .................. H04W 52/383
370/254
2014/0328313 A1\* 11/2014 Merlin .................. H04J 1/02
370/328
(Continued)

FOREIGN PATENT DOCUMENTS

JP    5785329 B2   9/2015

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.
(Continued)

Primary Examiner — Abdeltif Ajid
(74) Attorney, Agent, or Firm — Foley & Lardner LLP

(57) ABSTRACT

According to one embodiment, a wireless communication device includes a receiver, a controller and a transmitter. The receiver receives a terminal identifier of a first terminal being a target for downlink frequency multiplexing transmission from another wireless communication device, and receives information identifying, of a plurality of frequency components, a first frequency component allocated to the first terminal. The controller selects, of a plurality second terminals belonging to the wireless communication device, a second terminal having a terminal identifier same as that of the first terminal and allocates the first frequency component to the selected second terminal. The transmitter transmits a header at a band including the plurality of
(Continued)

frequency components, the header including the terminal identifier of the selected second terminal in a first field corresponding to the first frequency component, and transmits a first frame addressed to the selected second terminal via the first frequency component.

14 Claims, 29 Drawing Sheets

(51) Int. Cl.
*H04W 72/044* (2023.01)
*H04B 7/06* (2006.01)
*H04W 72/27* (2023.01)
*H04W 84/12* (2009.01)

(52) U.S. Cl.
CPC .......... *H04L 5/0037* (2013.01); *H04L 5/0073* (2013.01); *H04W 72/044* (2013.01); *H04W 72/27* (2023.01); *H04L 5/0007* (2013.01); *H04L 5/0023* (2013.01); *H04L 5/0041* (2013.01); *H04W 84/12* (2013.01)

(56) References Cited

U.S. PATENT DOCUMENTS

| | | |
|---|---|---|
| 2015/0172012 A1 | 6/2015 | Abeysekera et al. |
| 2015/0215903 A1* | 7/2015 | Zhao ................... H04W 56/002 370/329 |
| 2016/0353357 A1* | 12/2016 | Asterjadhi ............ H04L 5/0055 |
| 2018/0176921 A1* | 6/2018 | Cariou ................ H04W 72/541 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

Stacey, Robert: "Specification Framework for TGax", IEEE 802.11-15/0132r17 (11-15-0132-17-00ax-spec-framework), Intel, May 2016, pp. 1-61.

* cited by examiner

| Frame Control | Duration /ID | Address 1 | Address 2 | Address 3 | Sequence Control | QoS Control | HT Control |

| STA11 | ID1 |
|-------|-----|
| STA12 | ID2 |
| STA13 | ID3 |
| STA14 | ID4 |
| STA15 | ID5 |
| STA16 | ID6 |

| STA21 | ID1 |
|-------|-----|
| STA22 | ID2 |
| STA23 | ID3 |
| STA27 | ID7 |
| STA28 | ID8 |
| STA29 | ID9 |

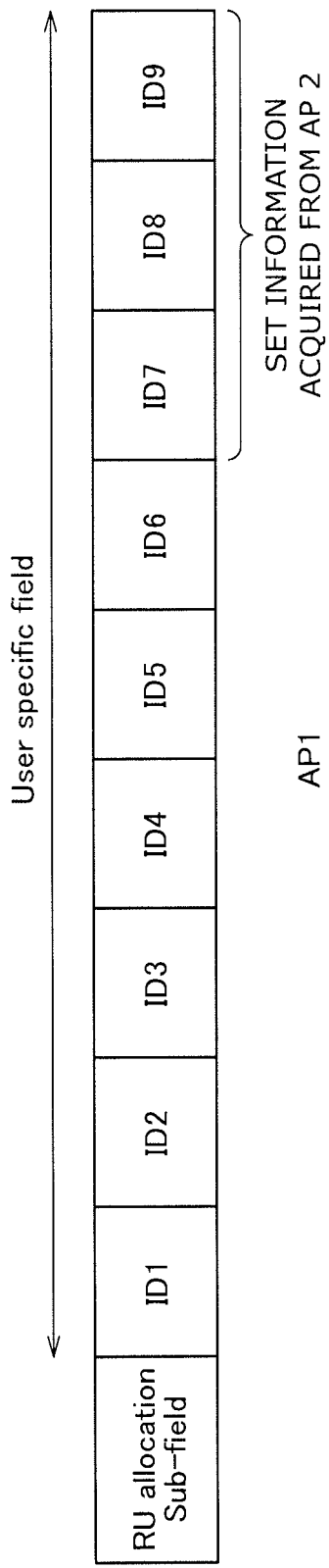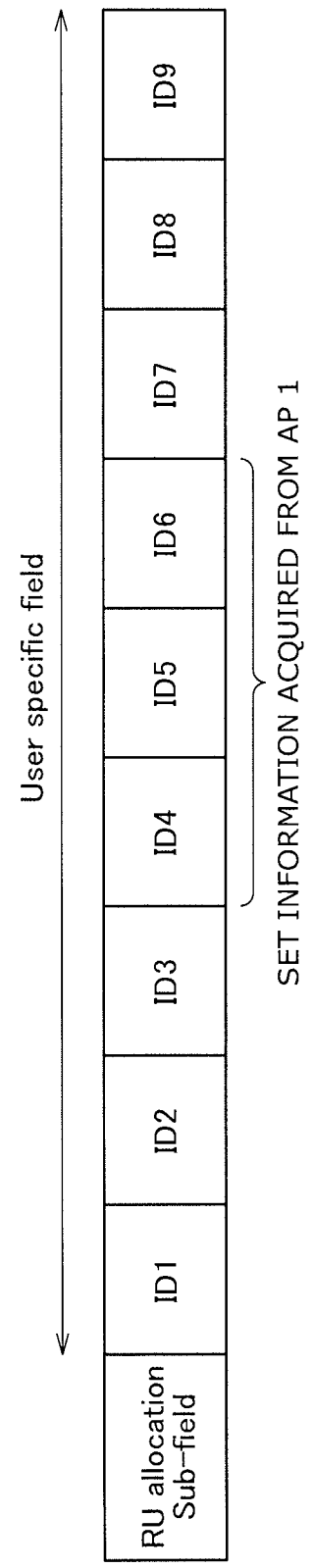

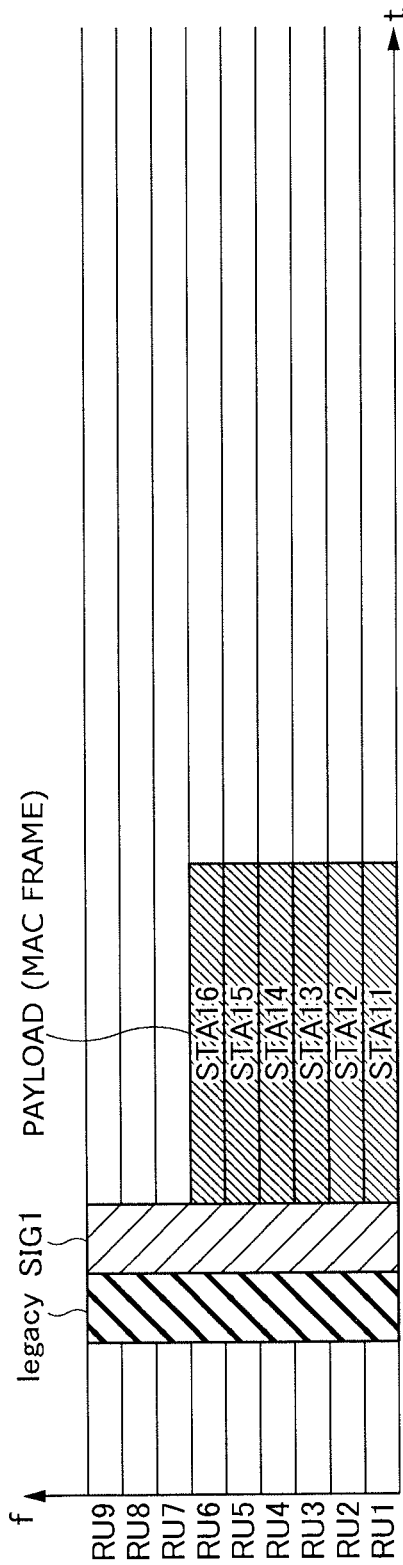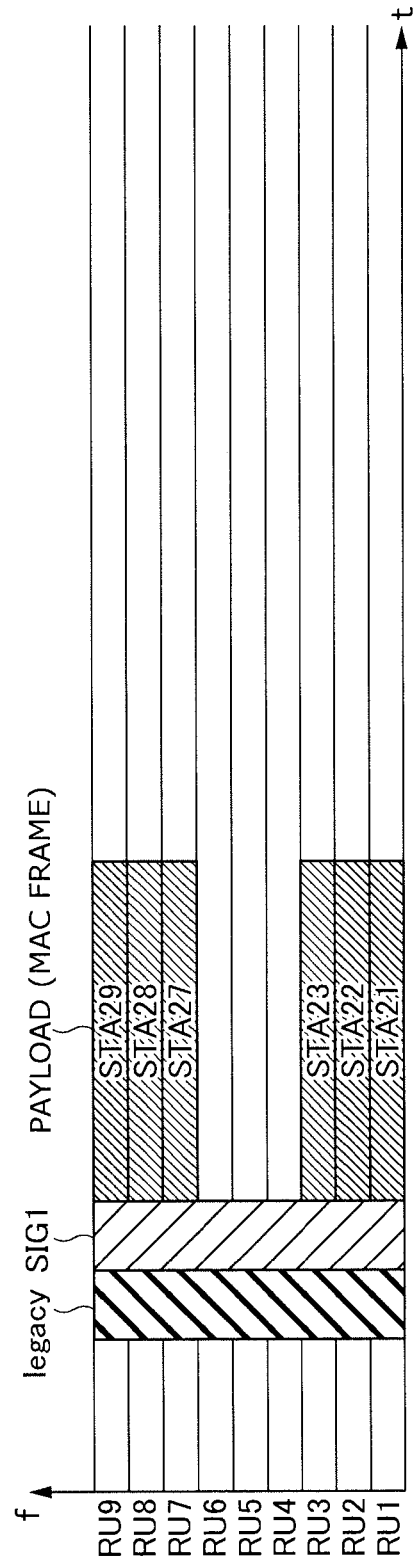

| Frame Control | Duration /ID | Address 1 | Address 2 | Address 3 | COMMON Info | Per User Info 1 | Per User Info 2 | ... | Per User Info N | FCS |

FIG. 16

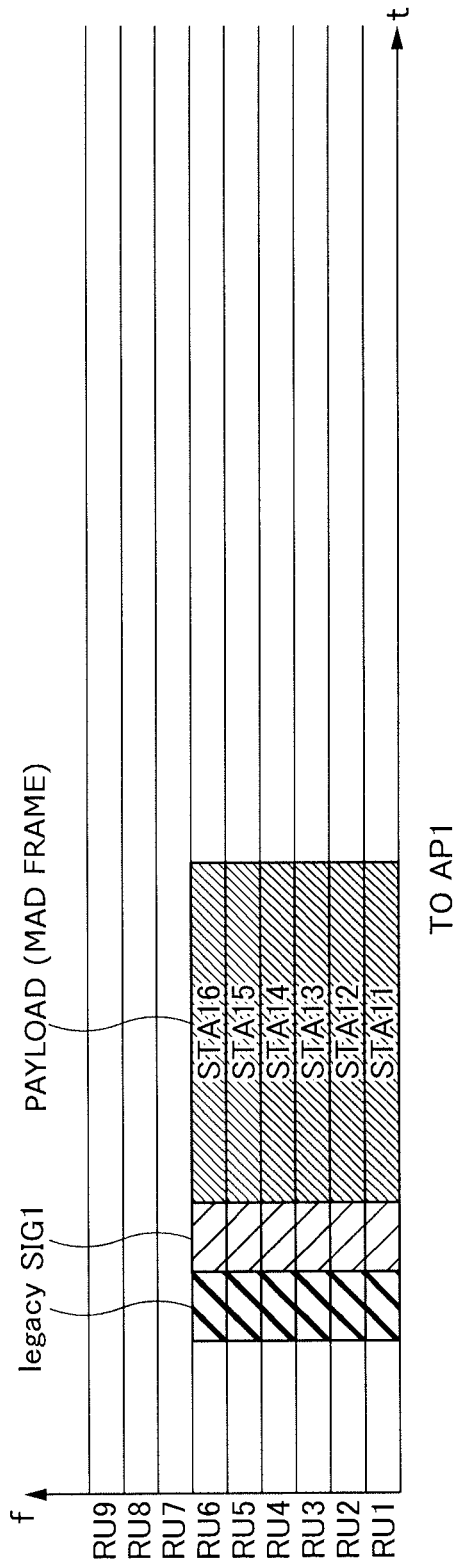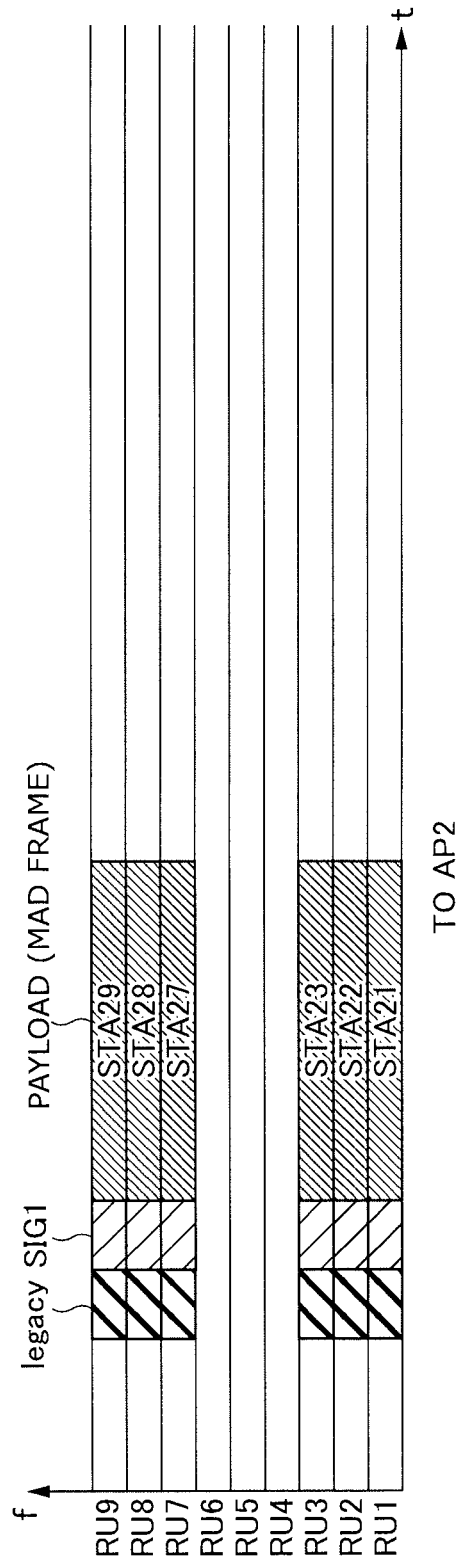

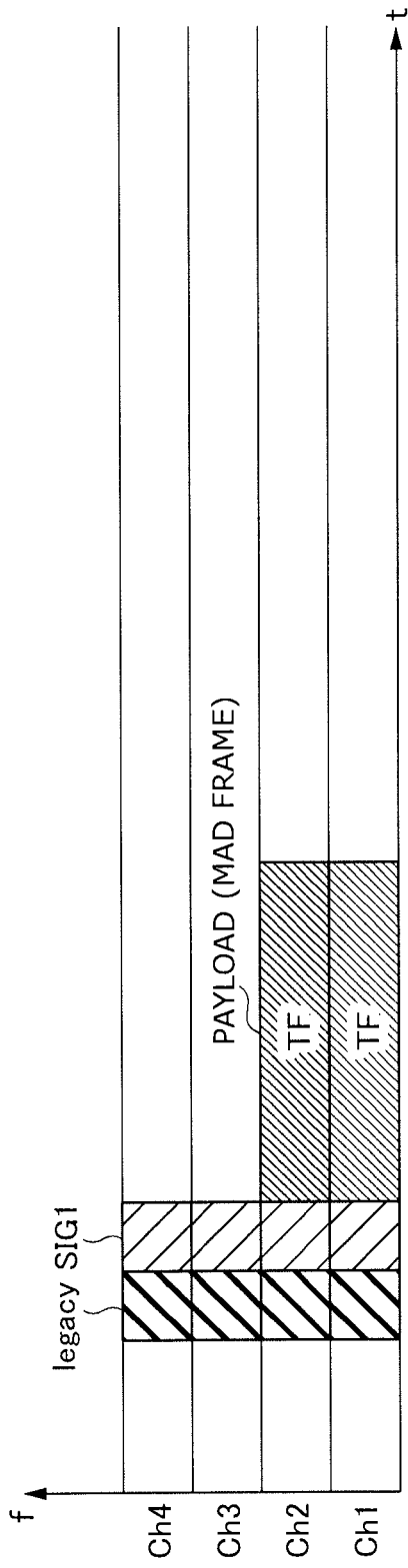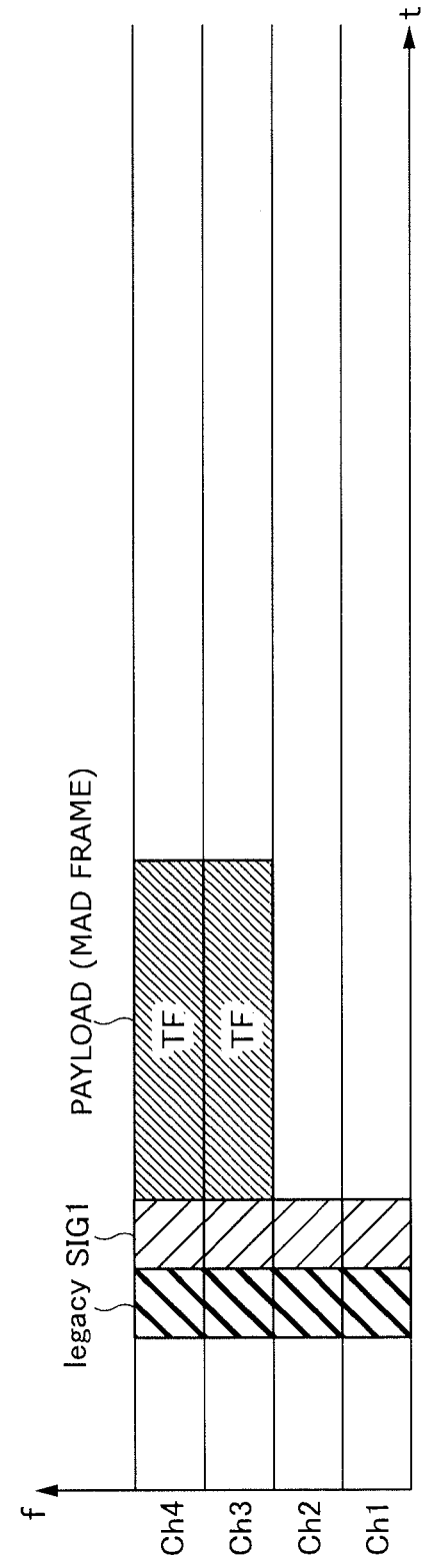

WIRELESS COMMUNICATION DEVICE

CROSS REFERENCE TO RELATED APPLICATIONS

This application is a continuation of U.S. patent application Ser. No. 15/918,295, filed on Mar. 12, 2018, which is based upon and claims the benefit of priority from the prior Japanese Patent Application No. 2017-050186, filed on Mar. 15, 2017, the entire contents of all of the above applications are incorporated herein by reference.

FIELD

Embodiments described herein relate to a wireless communication device.

BACKGROUND

To a cellular system, there has been recently introduced a Fractional Frequency Reuse (FFR) scheme of repeatedly reusing a frequency partially to reduce interference with an adjacent base station. In FFR, for example, a coverage area of the base station is divided into an area near the base station and an area far from the base station, and the near area and the far area are allocated with frequency channels different from each other. The frequency channel used in the area near the base station is the same among the adjacent base stations, and the frequency channel used in the area far from the base station is different between the adjacent base stations. This suppresses decrease in the frequency usage efficiency and improves a throughput of a user.

Concerning the next generation wireless LAN standard, IEEE802.11ax, an AP cooperation technique has been considered as one of differentiation technologies for an access point. In IEEE802.11ax, an orthogonal frequency division multiple access (OFDMA) is introduced, and thus, the frequency is likely to be efficiently used by applying FFR to wireless LAN as one of the AP cooperation techniques. However, there has been no concrete proposal to apply FFR to wireless LAN.

BRIEF DESCRIPTION OF THE DRAWINGS

FIG. 9A and FIG. 9B are each a diagram showing an exemplary terminal identifier assigned to each terminal;

FIG. 10A and FIG. 10B are each a diagram illustrating an example in which the adjacent APs set the same value in a field in cooperation with each other;

FIG. 11A and FIG. 11B are diagrams respectively showing exemplary physical packets an AP 1 and an AP 2 transmit by way of DL-OFDMA;

FIG. 16 is a diagram showing an exemplary format of a trigger frame (TF);

FIG. 19A and FIG. 19B are diagrams respectively showing exemplary physical packets transmitted by way of UL-OFDMA;

FIG. 20A and FIG. 20B are each a diagram showing an example of transmitting the TF by way of channel-based DL-OFDMA;

DETAILED DESCRIPTION

According to one embodiment, a wireless communication device includes a receiver, a controller and a transmitter. The receiver receives a terminal identifier of a first terminal being a target for downlink frequency multiplexing transmission from another wireless communication device, and receives information identifying, of a plurality of frequency components, a first frequency component allocated to the first terminal. The controller selects, of a plurality second terminals belonging to the wireless communication device, a second terminal having a terminal identifier same as that of the first terminal and allocates the first frequency component to the selected second terminal. The transmitter transmits a header at a band including the plurality of frequency components, the header including the terminal identifier of the selected second terminal in a first field corresponding to the first frequency component, and transmits a first frame addressed to the selected second terminal via the first frequency component.

The known wireless LAN standards IEEE Std 802.11™-2012 and IEEE Std 802.11ac™-2013, and the next generation wireless LAN standard IEEE 802.11-15/0132r17 that is the specification framework document for IEEE Std 802.11ax are entirely incorporated herein by reference.

Hereinafter, a description is given of embodiments of the present invention with reference to the drawings.

First Embodiment

Figure 1:
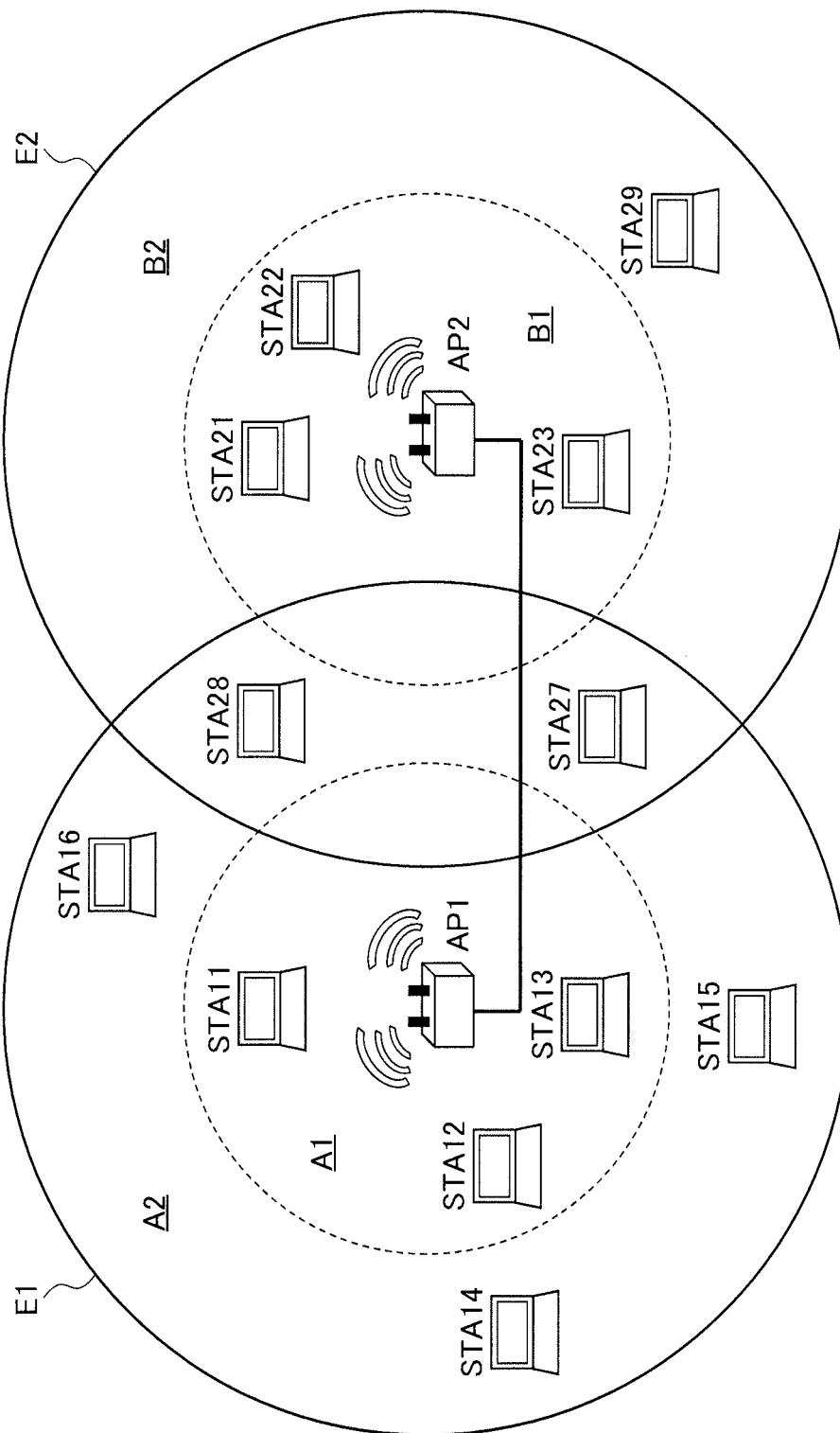
FIG. 1 is a diagram showing a configuration of a wireless communication system according to a first embodiment.

FIG. 1 shows a configuration of a wireless communication system according to a first embodiment. This wireless communication system complies with IEEE802.11 standard, but a system complying with another communication scheme than this may be adopted. An AP 1 and an AP 2 are located as a plurality of access points (APs). Three or more than APs may be located.

A basic service set (BSS) 1 is a wireless communication group formed by the AP 1, to which belong a terminal 11, a terminal 12, a terminal 13, a terminal 14, a terminal 15, and a terminal 16 that are a plurality of terminals as stations (STAs). In other words, the terminal 11 to the terminal 16 each perform an association process with the AP 1 and complete exchange of parameters required for the communication to establish a wireless link with the AP 1. A state where the terminal establishes the wireless link with the AP 1 is sometimes referred to as a state where the terminal connects with the AP 1. The AP 1 and the terminal 11 to the terminal 16 are respectively equipped with a wireless communication device. The wireless communication device equipped in the AP 1 communicates with the wireless communications equipped in the terminal 11 to the terminal 16 in compliance with IEEE802.11ax standard. There may exist other terminal than the terminals 11 to 16 in the BSS 1. The relevant terminal may be a terminal complying with IEEE802.11ax standard or a legacy terminal (terminal complying with IEEE802.11b/a/g/n/ac).

Similarly, a basic service set (BSS) 2 is a wireless communication group formed by the AP 2, to which belong a terminal 21, a terminal 22, a terminal 23, a terminal 27, a terminal 28, and a terminal 29. In other words, the terminal 21 to the terminal 23 and the terminal 27 to the terminal 29 each perform the association process with the AP 2 to establish a wireless link with the AP 2. The AP 2, and the terminals 21 to 23 and 27 to 29 are respectively equipped with a wireless communication device. The wireless communication device equipped in the AP 2 communicates with the wireless communications equipped in the terminals 21 to 23 and 27 to 29 in compliance with IEEE802.11 standard. There may exist other terminal than the terminals 21 to 23 and 27 to 29 in the BSS 2. The relevant terminal may be a terminal complying with IEEE802.11ax standard or a legacy terminal (terminal complying with IEEE802.11b/a/g/n/ac).

The AP 1 and the AP 2 are connected with each other via a wireless network or a wired network. The AP 1 and the AP 2 may communicate with each other in accordance with a scheme complying with IEEE802.11 standard or other standards. The AP 1 and the AP 2 may be directly connected with each other via a cable to carry out wired communication. In the example in FIG. 1, the AP 1 and the AP 2 are connected with each other via the wired network.

The terminal 11 to the terminal 13 belong to an area (neighbor area) A1 near the AP 1 in a communication area E1 of the AP 1. The terminal 14 to the terminal 16 belong to an area (distant area) A2 far from the AP 1 in the communication area E1.

Similarly, the terminal 21 to the terminal 23 belong to an area (neighbor area) B1 near the AP 2 in a communication area E2 of the AP 2. The terminal 27 to the terminal 29 belong to an area (distant area) B2 far from the AP 2 in the communication area E2.

The neighbor area A1 is an area where a signal from an adjacent AP (AP 2, here) does not reach or a signal strength from the AP 2 is low. In other words, the neighbor area A1 is an area where the signal from the AP 2 does not interfere with the signal from AP 1 or the interference is small. In the distant area A2 of the AP 1, there is a part (referred to as an overlap area) overlapping the communication area of the adjacent AP 2, in which a strength of the signal received from the AP 2 is high, and if that signal interferes with the signal from the AP 1, the signal from the AP 1 may not be able to be correctly decoded. In the distant area A2, in other area than the overlap area, there is no or small interference with the AP 2, similar to the neighbor area. The neighbor area B1 and distant area B2 of the AP 2 have the same conditions as for the neighbor area A1 and the distant area A2 concerning the interference with the adjacent AP, with only the adjacent AP being exchanged to the AP 1.

In the example shown in the figure, the terminal 11 to the terminal 13 exist in the neighbor area A1 of the AP 1, and the terminal 14 to the terminal 16 exist in the distant area A2. The terminal 21 to the terminal 23 exist in the neighbor area B1 of the AP 2, and the terminal 27 to the terminal 29 exist in the distant area B2. The terminal 27 and the terminal 28 of the terminals belonging to the AP 2 exist in the overlap area.

The AP has the basically same function as the terminal (STA) except for having a relay function, and thus, is also one form of the terminal. In the example in FIG. 1, the AP 2 is not included in the communication area E1 of the AP 1 and the AP 1 is not included in the communication area E2 of the AP 2, but in a case where the AP 1 and the AP 2 communicate with each other by way of the wireless communication complying with the same standard as the terminal, transmitted power may be set higher than that of the terminal to perform the communication between the AP 1 and the AP 2.

The AP 1 can perform OFDMA (Orthogonal Frequency Division Multiple Access) communication that is frequency-multiplexed communication, with one or more terminals selected from the plural terminals 11 to 16. In OFDMA, a resource unit (RU) containing one or more subcarriers is allocated as communication resource to the terminal such that the simultaneous communications are performed with the plural terminals via the respective different RUs. Such OFDMA is particularly referred to as RU-based OFDMA. The RU may be also referred to as a sub, a resource block, a frequency block, and the like. Uplink OFDMA is designated as UL-OFDMA, and downlink OFDMA is designated as DL-OFDMA. In the present embodiment, at least the AP 1 is capable of DL-OFDMA.

Similarly, the AP 2 can perform OFDMA (Orthogonal Frequency Division Multiple Access) communication with one or more terminals selected from the plural terminals 21 to 23 and 27 to 29. In the present embodiment, the AP 2 is capable of at least DL-OFDMA of UL-OFDMA and DL-OFDMA.

Figure 2:
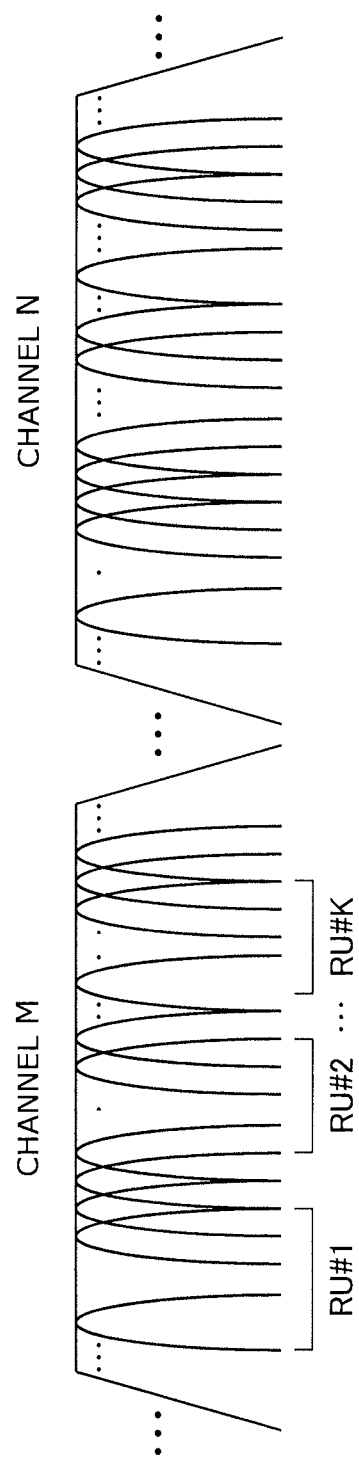
FIG. 2 is a diagram showing a plurality of RUs (resource units) secured in continuous frequency domains of one channel.

FIG. 2 shows resource units (RU #1, RU #2, RU #K) secured in continuous frequency domains of one channel (designated as a channel M, here). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. The bandwidth of one channel may be for example, though not limited to these, 20 MHz, 40 MHz, 80 MHz, and 160 MHz. One channel may be constituted by combining a plurality of channels of 20 MHz. OFDMA communication is realized by different resource units being simultaneously used by different terminals.

The number of the subcarriers (tones) contained in one resource unit may be different for each resource unit. For example, the number of the subcarriers (tones) in one RU may be variously 26, 52, 106, and 242.

Figure 3:
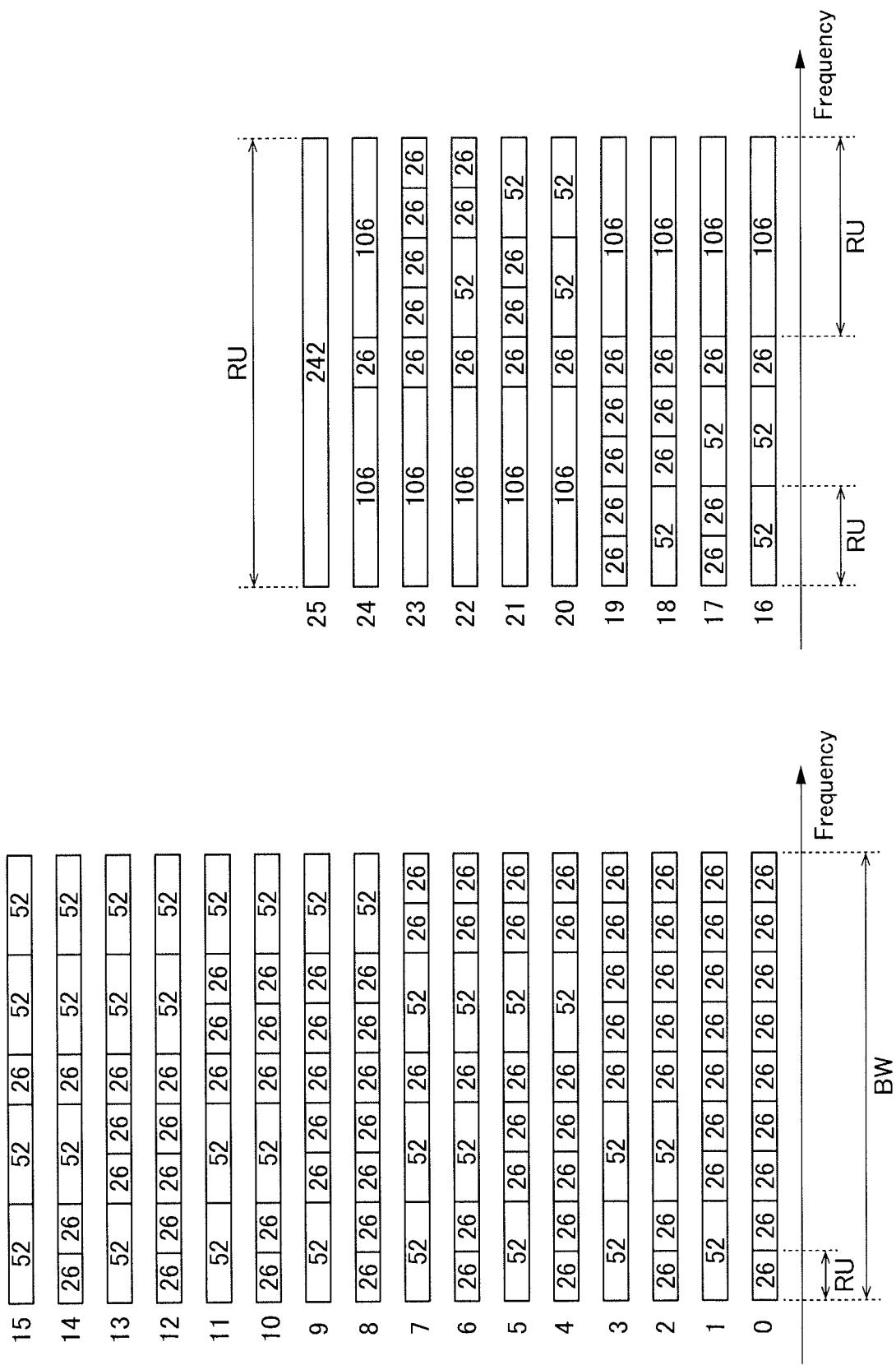
FIG. 3 is a diagram showing an allocation pattern of the RU in a frequency bandwidth.

FIG. 3 shows an allocation pattern of the RU in a certain frequency bandwidth BW (20 MHz, here). For example, 26 patterns may be adopted. Assume that 26 subcarriers are included in the RU arranged at the center of the frequency bandwidth. A numeral on the left side of each pattern in the figure represents an allocation pattern number. A numeral in each rectangle represents the number of the subcarriers.

Figures 4A, 4B:
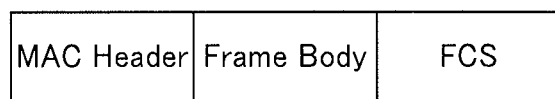
FIG. 4A and FIG. 4B are each a diagram showing an exemplary basic format of a MAC frame.

FIG. 4A shows an exemplary basic format of a MAC frame. The MAC frame according to the present embodiment is based on such a frame format. This frame format contains fields of a MAC header, a Frame body, and an FCS. The MAC header contains fields of a Frame Control, a Duration/ID, an Address 1, an Address 2, an Address 3, a Sequence Control, a QoS Control, and an HT (High Throughput) control as shown in FIG. 4B.

These fields do not need to always exist and there may be cases where some of these fields do not exist. The field of Address 3 may not exist in some cases, for example. Also, there may be other cases where both or either one of the QoS Control field and the HT Control field does not exist. Also, there may be still other cases where the frame body field does not exist. Also, any field or fields that are not illustrated in FIG. 4B may exist. For example, an Address 4 field may further exist.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

Two fields of Type and Subtype or the like are set in the Frame Control field. The rough classification of the MAC frame as to whether it is the data frame, the management frame, or the control frame is made by the Type field, and more specific types, for example, fine discrimination among the roughly classified frames is made by the Subtype field. A trigger frame described later may be also classified by the Type and the Subtype in combination with each other.

The Duration/ID field describes the medium reserve time, and it is determined that the medium is virtually in the busy state from the end of the physical packet containing this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector). The Sequence control field stores therein a sequence number of a frame or the like. The QoS control field is used to carry out QoS control to carry out transmission with the priorities of the frames taken into account. The HT Control field is a field introduced in IEEE802.11n.

In the management frame, an information element (IE) to which a unique Element ID (IDentifier) is assigned is set in the Frame Body field.

One or a plurality of information elements may be set in the Frame Body field.

Frame check sequence (FCS) information is set in the FCS field as a checksum code for use in error detection of the frame on the reception side. As an example of the FCS information, CRC (Cyclic Redundancy Code) may be mentioned.

Figure 5:
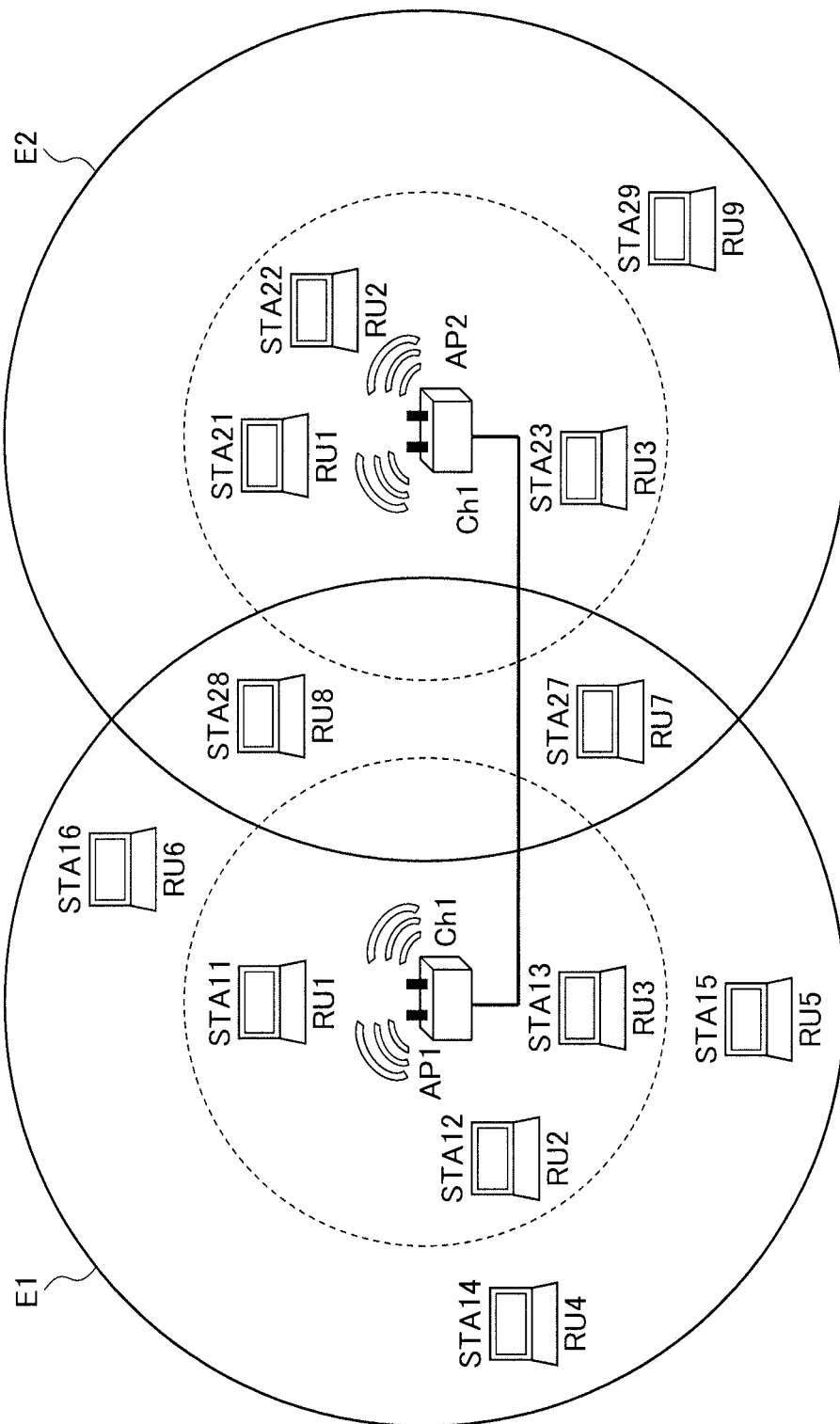
FIG. 5 is a diagram illustrating an example in which each of adjacent APs (access points) 1 and 2 performs DL-OFDMA transmission.

A description is given of the technical challenge to be solved by the present embodiment with reference to FIG. 5. FIG. 5 shows an example in which the AP 1 performs DL-OFDMA communication with the terminals 11 to 16, and the AP 2 performs DL-OFDMA communication with the terminals 21 to 23 and 27 to 29. Assume that both the AP 1 and the AP 2 use a channel 1 (Ch1) as the same frequency band. The AP 1 allocates the resource units (RUs) 1 to 6 to the terminals 11 to 16, respectively. The AP 2 allocates the RU 1 to the RU 3 and the RU 7 to the RU 9 to the terminals 21 to 23 and 27 to 29, respectively. A bandwidth of the channel may be variously 20 MHz, 40 MHz, 80 MHz, and 160 MHz, and here assume 20 MHz. The channel 1 includes the RUs 1 to 9.

Figure 6:
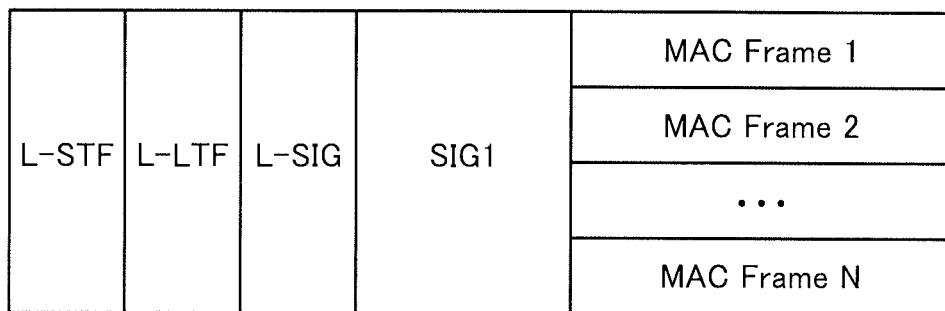
FIG. 6 is a diagram showing an exemplary structure of a physical packet used for DL-OFDMA.

An exemplary operation of DL-OFDMA transmission from the AP 1 to the terminals 11 to 16 is described. FIG. 6 shows an exemplary structure of a physical packet used for DL-OFDMA. Assume a situation where the AP 1 transmits by way of DL-OFDMA the MAC frames (MAC frames 11 to 16) to the terminals 11 to 16, respectively. The AP 1 transmits a physical packet containing a legacy field, the SIG 1 field, and the MAC frames transmitted via the RU for each of the terminals 11 to 16. In other words, the common SIG 1 field is added to the MAC frames 11 to 16 addressed to the terminals 11 to 16. Then, the legacy field defined by IEEE802.11 standard is added to a head of the SIG 1 field to configure the physical packet. Therefore, in the physical packet for the terminals 11 to 16, the legacy field and the SIG 1 field are common to the terminals 11 to 16 and the MAC frames are individually set for the respective terminals. Another field (e.g., SIG 2 field, STF (Short Training Field), LTF (Long Training Field) and the like) may be provided for each RU between the SIG 1 field and the MAC frames.

The legacy field includes an L-STF (Legacy-Short Training Field), an L-LTF (Legacy-Long Training Field), and an L-SIG (Legacy Signal Field). The L-STF, the L-LTF, and the L-SIG, which are each a field capable of being recognized by a terminal of the legacy standard such as IEEE802.11a, for example, have stored therein information such as on signal detection, frequency correction (channel estimation), and transmission speed.

Control information notified to the terminals 11 to 16 is set in the SIG 1 field. As an example of the control information, set is information specifying the RU for each of the terminals 11 to 16 (RU 1 to RU 6, here). Concretely, the information is set with a terminal identifier of the terminal (also designated as STAID in some cases) being associated with the RU to be used. The terminal identifier (STAID) may be an Association ID (AID) assigned from the AP 1 in the association process, a part of the AID (Partial AID), or another identifier such as a MAC address. In the SIG 1 field, information required for decoding the MAC frame such as MCS (Modulation And Coding Scheme), or other information may be set for each of the RUs specified to the terminals 11 to 16. The SIG 1 field includes a PHY HE-SIG-A field and an HE-SIG-B field investigated in IEEE802.11ax as an example.

Figure 7:
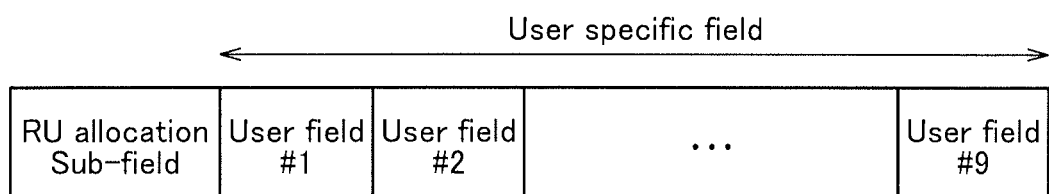
FIG. 7 is a diagram showing an exemplary format of a field for specifying the RU for each terminal.

FIG. 7 shows an exemplary format of a field for specifying the RU for each terminal in the SIG 1 field. The field shown in the figure contains an RU allocation Sub-field and a User specific field which is defined in the PHY HE-SIG-B field investigated in IEEE802.11ax. The RU allocation Sub-field is set to a value indicating a RU allocation pattern. For example, a value "00000000" means the allocation patterns of nine RUs (9 multiplex allocation) with one RU including 26 subcarriers. Nine RUs are assigned with numbers (#1 to #9) in accordance with a predetermined rule. These RUs are represented as an RU #1 to an RU #9. The User specific field includes a User field #1 to a User field #9. The number of the User fields is variable and, here, corresponds to a case where a value of the RU allocation Sub-field is "00000000" (9 multiplex allocation) described above. The User field #1 to the User field #9 are respectively associated with the RU #1 to the RU #9, and are respectively set to information (terminal allocation information) on the terminals allocated with the RU #1 to the RU #9. For example, the User field may be set to the terminal identifier (STAID). Besides the STAID, it may be set to the information such as the MCS.

For example, a case where the User field #1 set to STA1 and MCS3 means the RU #1 is allocated to a terminal having STA1 and a MAC frame transmitted via the RU #1 is decoded by the MCS identified from MCS3. The following description assumes a case where the SIG 1 field contains the field in FIG. 7. However, a format for allocating the RU for each terminal is not limited to that in FIG. 7, and another format may be adopted.

If another field (e.g., the SIG 2 field) is provided for each RU between the SIG 1 field and the MAC frames, the MCS required for decoding the MAC frame may be configured to be set not in the SIG 1 field but in the SIG 2 field.

The AP 1 transmits the legacy field and the SIG 1 field at the channel width band (20 MHz) to transmit, for each RU specified in the SIG 1 field, the MAC frame addressed to the terminal allocated with the RU.

The terminals 11 to 16 receiving the signal from the AP 1 process the legacy field before decoding the SIG 1 field to identify the RU which the terminal itself is to decode. For example, each terminal confirms a value of the RU allocation Sub-field in FIG. 7 to identify the RU allocation pattern. Here, the value of the RU allocation Sub-field of "00000000" (9 multiplex allocation) is confirmed. Each terminal checks whether or not the User field in which the STAID of the terminal itself is set exists among the User field #1 to the User field #9. If the terminal detects the User field in which the STAID of the terminal itself is set, the terminal confirms that the terminal itself is allocated with a signal of the RU associated with the number of the User field. For example, if the terminal 13 detects that the User field #3 is set to the STAID of the terminal 13 itself, the terminal 13 confirms that the RU #3 is allocated to itself. The terminal also detects information (MCS or the like) other than the STAID from the User field in which the STAID of the terminal itself is detected. Each terminal decodes the signal of the RU allocated to the terminal itself using the detected MCS to decode the subsequent payload so as to receive the MAC frame addressed to the terminal itself. In the example, in this way, the terminals 11 to 16 receive the MAC frames 11 to 16 addressed to the terminals themselves via the RU #1 to the RU #6, respectively. The terminals 11 to 16 carry out a check (CRC check or the like) on the basis of the FCS in the MAC frame, and if a check result is a success, they transmit an acknowledgement response frame (e.g., ACK frame, BA (Block Ack) frame, or the like) to the AP 1, as needed. The ACK frame is transmitted by, for example, a carrier sense on the basis of CSMA/CA to acquire an access right with respect to the wireless medium.

Similarly, the AP 2 also transmits by way of DL-OFDMA the MAC frames (MAC frames 21 to 23 and 27 to 29) to the terminals 21 to 23 and 27 to 29, respectively. Concretely, the AP 2 transmits a physical packet containing the legacy field, the SIG 1 field, and a plurality of MAC fields addressed to the terminals 21 to 23 and 27 to 29. In the SIG 1 field, set is information specifying the RUs (the RU 1 to the RU 3 and the RU 7 to the RU 9, here) allocated to the terminals 21 to 23 and 27 to 29 or the like using the format in FIG. 7. The terminals 21 to 23 and 27 to 29 receiving the signals downlink-transmitted from the AP 2 respectively identify the RUs allocated to the terminals themselves from the SIG 1 fields in a manner similar to the terminals 11 to 16. Then, the terminals respectively decode the payloads transmitted via the relevant RUs to receive the MAC frames 21 to 23, 27 to 29 addressed to the terminals themselves.

Figure 8:
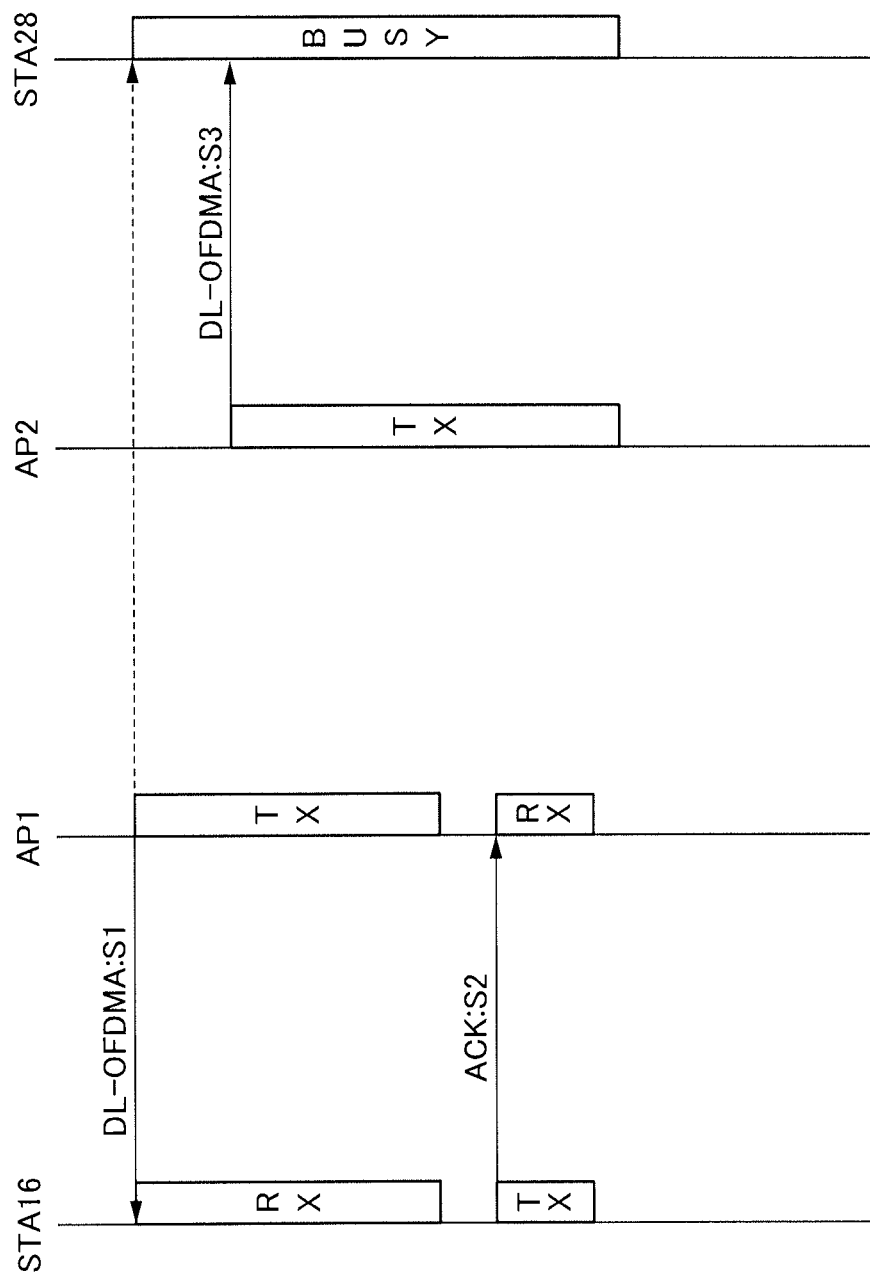
FIG. 8 is a diagram showing a situation in which decoding is failed owing to signal collision.

Here, because the AP 1 and the AP 2 use the same channel (Ch1), the terminals 27 and 28, for example, in the overlap area receive the signals from both APs and fail to decode the signals owing to signal collision in some cases, if the AP 2 performs the DL-OFDMA transmission when the AP 1 performs DL-OFDMA transmission, or if the AP 1 and the AP 2 simultaneously perform DL-OFDMA transmission. FIG. 8 shows this situation. The example shows an exemplary operation focusing on the terminal 16 and the terminal 28. The characters "TX" and "RX" mean the transmission and the reception, respectively.

The AP 1 transmits by way of DL-OFDMA a physical packet (S1), and the terminal 16 receives the physical packet. The terminal 16 succeeds in receiving the MAC frame addressed to the terminal 16 itself and transmits an ACK frame (S2). The signal transmitted by the AP 1 is also received by the terminal 28 in the overlap area. The terminal 28, while receiving the signal from the AP 1, also receives the physical packet signal transmitted by way of DL-OFDMA transmission from the AP 2 (S3), which is dealt with as a reception error, and then fails to decode the physical packet (fails to decode the header or the like). Here, the terminal 28 is focused on, but a similar situation occurs in the terminal 27. The terminals 21 to 23 and 29, which the signal from the AP 1 does not reach, succeed in receiving the physical packet transmitted from the AP 2. The terminals 11 to 15 belonging to the BSS 1, which the signal from the AP 2 also does not reach, succeed in receiving the physical packet transmitted from the AP 1. In this way, in the case where the AP 1 and the AP 2 adjacent to each other use the same channel, the terminal the signal from the adjacent AP does not reach succeeds in receiving the physical packet transmitted by way of DL-OFDMA transmission from the AP in the BSS of itself, but the terminal the signal from the adjacent AP reaches is likely to fail to receive the physical packet transmitted by way of DL-OFDMA transmission from the AP in the BSS of itself owing to the signal collision. This leads to decrease in frequency usage efficiency.

In the present embodiment, the AP 1 and the AP 2 communicate with each other to cooperatively operate to improve the frequency usage efficiency. Concretely, the AP 1 and the AP 2 select the terminals having the same STAID as a terminal allocated with the same RU, and set the terminal allocation information of the selected terminal in the User field corresponding to the relevant RU. Each of the AP 1 and the AP 2 selects a terminal having an arbitrary STAID for the RU not used by a partner AP (the AP 2 with respect to the AP 1, or the AP 1 with respect to the AP 2), and sets the terminal allocation information of the selected terminal in the User field corresponding to the relevant RU. For the RU used by the partner AP, the terminal allocation information is acquired from the partner AP, and the acquired terminal allocation information is set in the User field corresponding to the relevant RU. On the basis of such a setting, values of the RU Allocation Sub-fields and User specific fields generated by the AP 1 and the AP 2 are the same values. Each of the AP 1 and the AP 2 generates the SIG 1 field containing the RU Allocation Sub-field and the User specific field. Note that values of another field in the SIG 1 field are identical between the AP 1 and the AP 2 in accordance with a predefinition or a previous cooperation. Then, each of the AP 1 and the AP 2 transmits the legacy field and the SIG 1 field at the channel width band, and transmits the MAC frame via the RU which the terminal itself allocates to the terminal. Each AP does not transmit the frame via RU which the terminal itself does not allocate to the terminal. The transmissions from the AP 1 and the AP 2 are simultaneously performed. The terminal receiving the signals from both the AP 1 and the AP 2 (e.g., the terminal in the overlap area, such as the terminals 28 and 27) receives the signals from the AP 1 and the AP 2 at the same time. Even if such a terminal receives the signals simultaneously transmitted from the AP 1 and the AP 2, since the values common to the AP 1 and the AP 2 are set in the legacy fields and the SIG 1 fields, the terminal can decode these fields. Therefore, the terminal can identify the RU allocated to the terminal itself from a result of decoding the SIG 1 field to receive the MAC frame transmitted via the identified RU. This allows DL-OFDMA transmission also to the terminal in the overlap area to be succeeded, improving the frequency usage efficiency.

Hereinafter, a specific example of this scheme is shown. As shown in FIG. 9A, assume that the AP 1 assigns an ID 1 to an ID 6 as the STAIDs to the STA 11 the STA 16. Assume that the AP 2 assigns the ID 1 to the ID 3 and an ID 7 to an ID 9 as the STAIDs to the STA 21 to the STA 23 and the STA 27 to the STA 29 as shown in FIG. 9B. The STAIDs of the STA 11 to the STA 13 are the same as the STAIDs of the STA 21 to the STA 23, respectively. In this case, consider a situation where the AP 1 and the AP 2 allocate the RUs to the terminals relating to themselves, and perform DL-OFDMA transmissions respectively to the STA 11 to the STA 16, and the STA 21 to the STA 23 and the STA 27 to the STA 29 as described in FIG. 5.

FIG. 10A shows an exemplary setting of the User field #1 to the User field #9 in the AP 1. FIG. 10B shows an exemplary setting of the User field #1 to the User field #9 in the AP 2.

Assume that both the AP 1 and the AP 2 use the same RUs (the RU #1 to RU #3, here) in the respective neighbor areas. Each of the AP 1 and the AP 2 sets the same STAIDs in the User Fields regarding these RUs. The AP 1 sets the ID 1 to the ID 3 (that is, the STAIDs of the terminal 11 to the terminal 13) in the User field #1 to the User field #3. The AP 2 sets the ID 1 to the ID 3 (that is, the STAIDs of the terminal 21 to the terminal 23) in the User field #1 to the User field #3.

On the other hand, both the AP 1 and the AP 2 allocate, as for the RUs used in the respective distant areas (the RU #4 to the RU #9, here), the RU not used by the partner AP to the terminal. In the example, the AP 1 sets the ID 4 to the ID 6 (that is, the STAIDs of the terminal 14 to the terminal 16) in the User field #4 to the User field #6. The AP 2 determines that the RU #4 to the RU #6 cannot be used because being used by the AP 1, but the RU #7 to the RU #9 are not used by the AP 1, and then, sets the ID 7 to the ID 9 (that is, the STAIDs of the terminal 27 to the terminal 29) in the User field #7 to the User field #9.

For the RU used by only the partner AP, both the AP 1 and the AP 2 acquire the terminal allocation information set for the relevant RU (here, assuming only the STAID for ease of description) from the partner AP, and set the acquired terminal allocation information in the User field corresponding to the relevant RU. In the example, the AP 1 sets the ID 7 to the ID 9 (that is, the STAIDs of the terminal 27 to the terminal 29) acquired from the AP 2 in the User field #7 to the User field #9. The AP 2 sets the ID 4 to the ID 6 (that is, the STAIDs of the terminal 14 to the terminal 16) acquired from the AP 1 in the User field #4 to the User field #6. This allows the values of the RU Allocation Sub-field and User specific field generated by the AP 1 and the AP 2 to be the same. In the RU allocation Sub-field, the same value between the AP 1 and the AP 2 is set.

In the User field, the STAID only is set as the terminal allocation information here, but other information such as the MCS may be set. In this case also, the AP 1 and the AP 2 cooperate with each other such that the same values between the AP 1 and the AP 2 are set in all of the User field #1 to the User field #9.

The AP 1 and the AP 2 transmit the same legacy fields and the same SIG 1 fields at the channel width band, and subsequently, each of them transmits, via the RU specified by itself to the terminal belonging to itself in the SIG 1 field, the relevant MAC frame addressed to the terminal.

FIG. 11A shows an exemplary physical packet the AP 1 transmits. An abscissa represents a time, and an ordinate represents a frequency. Here, the frequency increases in order from the RU #1 to the RU #9, but is not limited thereto. The legacy field and the SIG 1 field are transmitted at the channel width band (20 MHz), and the MAC frame is transmitted via the corresponding RU. If the above described another field is provided between the SIG 1 field and the MAC frame, the relevant field is also transmitted via the same RU as for the MAC frame. The RU not allocated with the terminal (the RU #7 to the RU #9) is not used for the transmission of the MAC frame. The characters "STA11" to "STA16" in the figure mean that the MAC frames are addressed to the terminals 11 to 16. FIG. 11B shows an exemplary physical packet the AP 2 transmits. In the AP 2, since the RU #4 to the RU #6 are not allocated to the terminals, the MAC frame is not transmitted via these RUs.

The terminal in the overlap area (assume the terminal 28, for example) receives the signals from both the AP 1 and the AP 2 at the same time. The legacy field and the SIG 1 field transmitted from the AP 1 and the legacy field and the SIG 1 field transmitted from the AP 2 are the same in the signals. Therefore, the terminal 28 can normally decode the legacy field and the SIG 1 field to detect the RU allocation Sub-field and the User specific field (see FIG. 10B). The terminal 28 detects the STAID (=ID 8) of the terminal 28 itself from the User field #8. Therefore, the terminal 28 can decode the signal transmitted via the RU #8 to receive the MAC field addressed to the terminal 28 itself. The MAC frame is not transmitted via the RU #7 to the RU #9 from the AP 1 such that the signal collision does not occur in the RU #8 via which the terminal 28 receives the signal.

As described above, the AP 1 and the AP 2 cooperate with each other to allocate the same RU used by both APs to the terminals having the same STAID and coordinate the information set in physical header parts (SIG 1 fields or the like) to be identical between the AP 1 and the AP 2 such that even if the AP 1 and the AP 2 use the same channel to perform OFDMA, the high frequency usage efficiency can be obtained. In other words, FFR for using the same RU by a plurality of APs at the same time can be achieved in a wireless LAN system.

Figure 12:
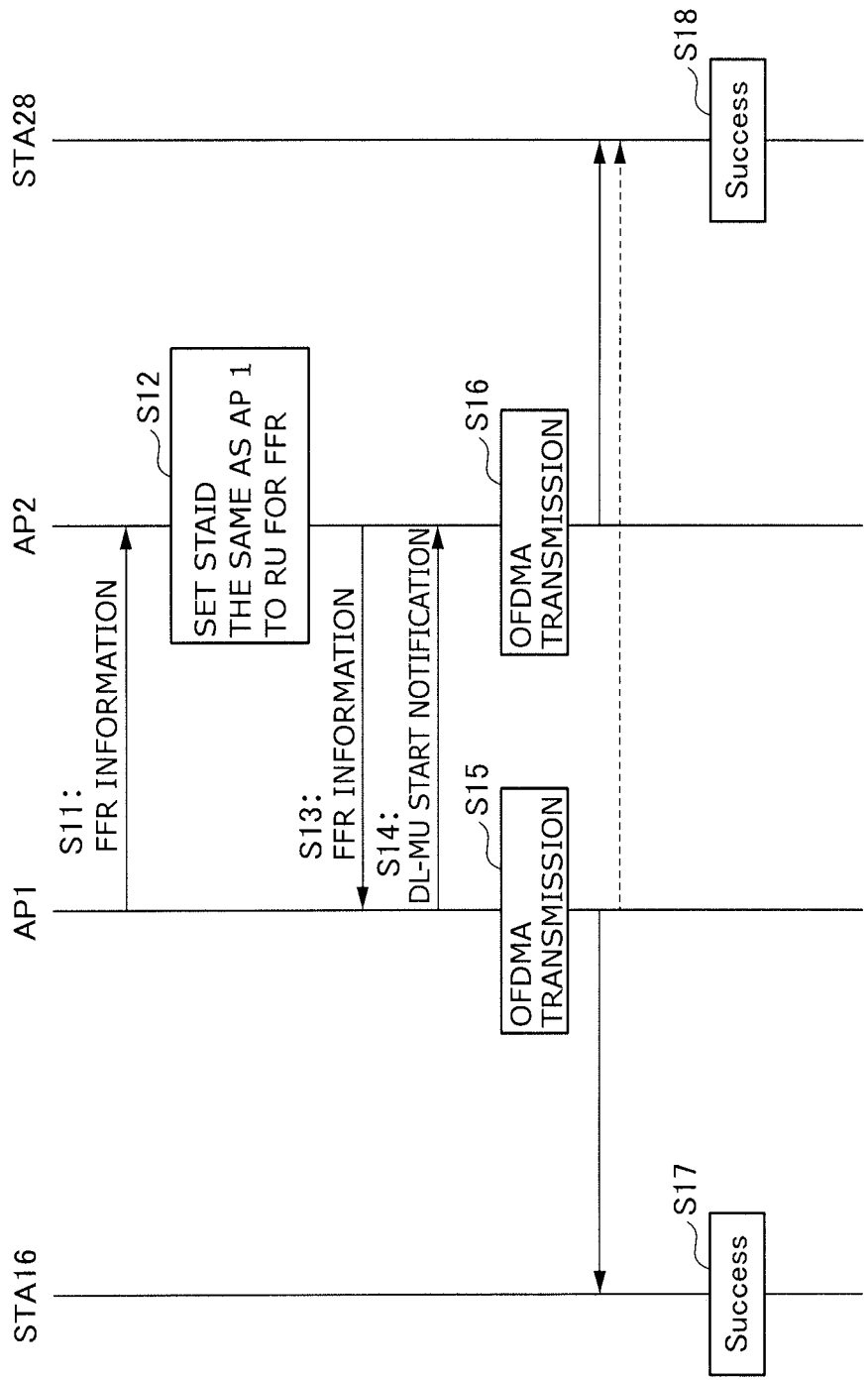
FIG. 12 is a diagram showing an operation sequence of a wireless LAN system according to the first embodiment.

FIG. 12 shows an exemplary operation sequence of a wireless LAN system according to the present embodiment. Once the AP 1 determines to cooperate with the AP 2 to perform DL-OFDMA transmission (a part of the RUs are used by both APs in common to perform DL-OFDMA transmission), it transmits data including information required for the cooperation (hereinafter, sometimes referred to as FFR information) to the AP 2 (S11).

More specifically, the AP 1 determines the RU allocation pattern to be used. Here, the 9 multiplex pattern described above is selected. On the basis of the number of the terminals in the neighbor area A1 or the like, the RU to be used in common with the AP 2 (the RU turned on an FFR function: RU for FFR) is determined. Here, the determination is made that the terminals 11 to 13 exist in the neighbor area A1 and the data to be transmitted to these terminals exists, and three RUs (the RU #1 to the RU #3, here) are determined as the RU for FFR. The AP 1 determines that the data to be transmitted to the terminals 14 to 16 in the distant area A2 exists, and determines the RU #4 to the RU #6 as the RUs allocated to these terminals. The AP 1 transmits, as FFR information to be transmitted to the AP 2, a value indicating the RU allocation pattern, information (FFR-on information) specifying the RU for FFR (the RU #1 to the RU #3), and information (FFR correspondence information) specifying the terminal allocation information associated with the RU (the RU #1 to the RU #6). The terminal allocation information includes at least STAID, and may include the MCS and other information. Here, the FFR-on information includes the identifiers of the RU #1 to the RU #3. The FFR correspondence information includes information associating the identifiers of the RU #1 to the RU #6 with the terminal allocation information of the terminal 11 to the terminal 16 (the ID 1 to the ID 6 or the like).

Note that the RU allocation pattern and the RU for FFR are determined by the AP 1 here, but, as another method, may be determined through negotiation between the AP 1 and the AP 2 in advance, or determined by the system or in a specification in advance.

The AP 2 grasps the RU for FFR on the basis of the FFR-on information included in the FFR information received from the AP 1. Here, the AP 2 grasps that the RU #1 to the RU #3 are the RUs for FFR. The AP 2 allocates the RU #1 to the RU #3 to the terminals having the STAIDs (the ID 1 to the ID 3) on the basis of the FFR correspondence information, similarly to the AP 1. Here, the RU #1 to the RU #3 are respectively allocated to the STA 21 to the STA 23 having the ID 1 to the ID 3 as the STAIDs. The AP 2 determines that the AP 1 does not use the RU #7 to the RU #9, and allocates the RU #7 to the RU #9 respectively to the STA 27 to the STA 29 having the ID 7 to the ID 9 as the STAIDs. The AP 2 transmits as the FFR information, to the AP 1, the terminal allocation information of the terminal allocated with the RU not used by the AP 1 and the identifier of the RU (S13). Here, transmitted is information associating the identifiers of the RU #7 to the RU #9 with the terminal allocation information of the terminal 27 to the terminal 29 (the ID 7 to the ID 9 or the like).

The AP 1 receiving the FFR information from the AP 2 determines execution timing for DL-OFDMA and transmits a DL-MU (Downlink Multi-User) notification frame including execution timing information to the AP 2 (S14). The execution timing for DL-OFDMA may be set in accordance with a time, or a time lapse from a head to an end a DL-MU start notification frame. One of a plurality of predetermined timing candidates may be specified. The execution timing may be specified by other methods than those mentioned here.

When the execution timing for DL-OFDMA arrives, the AP 1 and the AP 2 perform DL-OFDMA transmission (S15, S16). This allows the AP 1 and the AP 2 to simultaneously perform DL-OFDMA transmission. The AP 1 transmits the physical packet shown in FIG. 11A, and the AP 2 transmits the physical packet shown in FIG. 11B. Here, the values of the RU allocation Sub-fields and User specific fields in the physical packets transmitted by the AP 1 and the AP 2 are the same. Values of other fields in the SIG 1 field than these fields are identical between the AP 1 and the AP 2. The legacy fields are also identical between the AP 1 and the AP 2.

Each of the terminals 21 to 23 and 27 to 29 specified in the SIG 1 field in the physical packet transmitted by the AP 2 interprets the SIG 1 field, identifies the RU allocated to the terminal itself, and decodes the signal of the identified RU to receive the MAC frame. Particularly, the terminal 27 and the terminal 28 simultaneously receive the signals of the physical packets from both the AP 1 and the AP 2, but since the values of the SIG 1 fields are the same, the received signals can be correctly decoded (S18). The figure, focusing on the terminal 28, shows the situation where the terminal 28 succeeds in the reception, but the terminal 27, the terminals 21 to 23, and 29 can also correctly decode the received signals. Each of the terminals 11 to 16 specified in the physical packet transmitted by the AP 1 interprets the SIG 1 field, identifies the RU allocated to the terminal itself, and decodes the signal of the identified RU to receive the MAC frame (S17). The figure, focusing on the terminal 16, shows the situation where the terminal 16 succeeds in the reception, but the same holds for the terminals 11 to 15.

In the above exemplary sequence, a part of the RU #1 to the RU #9 is used as the RU for FFR, but all of the RU #1 to the RU #9 may be used as the RUs for FFR. A plurality of RUs for FFR may be also allocated to one terminal. Both the RU for FFR and RUs other than the RU for FFR (referred to as a usual RU) may be allocated to one terminal.

The AP 2 transmits, at step 13 in FIG. 12, the FFR information including the terminal allocation information of the terminal allocated with the RU (usual RU) other than the RU for FFR and the like, but if the AP 2 does not allocate the usual RU to the terminal, the transmission of the FFR information may be omitted. In this case, if the AP 1 does not receive the FFR information from the AP 2 even after elapse of a certain time period from transmitting the FFR information from the AP 1 itself, it may determine that the AP 2 does not allocate the usual RU to the terminal and transmit the DL-MU start notification frame.

If the AP 2 wants to use an RU as an RU for FFR different from the RU for FFR determined by the AP 1, the AP 2 may transmit a frame requesting to redetermine the RU for FFR to the AP 1. In this case, the AP 2 may specify the RU for FFR the AP 2 wants to use in the relevant frame. If the AP 1 receives the relevant frame, it redetermines the RU for FFR and performs again the sequence similar to that in FIG. 12.

Figure 13A:
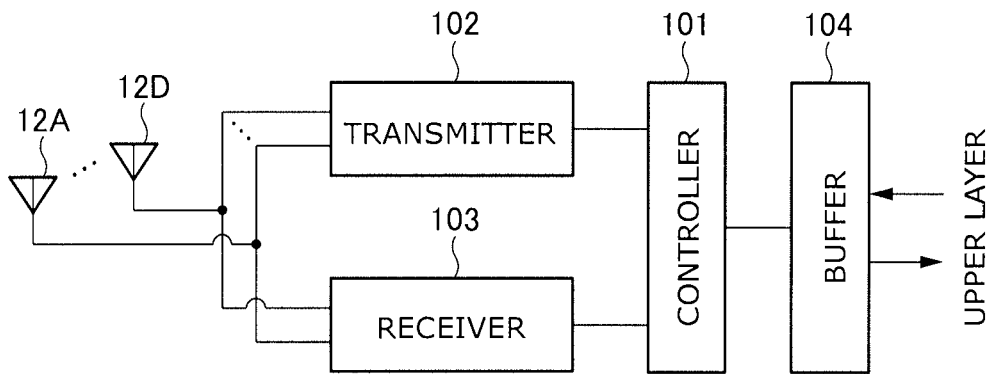
FIG. 13A is a block diagram of an AP according to the first embodiment.

FIG. 13A is a functional block diagram of the wireless communication device equipped in the AP 1 or the AP 2 (hereinafter, referred to as the AP). The AP performs the wireless communication with the terminal in the BSS formed by the AP. Here, a configuration is shown in a case where the AP communicates with the adjacent AP using the same communication scheme as the terminal.

The wireless communication device in the AP includes a controller 101, a transmitter 102, a receiver 103, antennas 12A, 12B, 12C and 12D, and a buffer 104. The number of the antennas is four here although at least one antenna may be provided. The controller 101 corresponds to controlling circuitry or a baseband integrated circuitry which controls communication with the terminals, and the transmitter 102 and the receiver 103 form a wireless communicator or an RF integrated circuitry which transmits and receives frames via the antenna as an example. A process of the controller 101, and all or a part of a digital region process of the transmitter 102 and the receiver 103 may be performed by software (program) executing on a processor such as a CPU, or may be performed by hardware, or may be performed by the both of software and hardware. The AP may include a processor performing the process of the controller 101, all or a part of the transmitter 102 and the receiver 103.

The buffer 104 is a storage for transferring a frame and the like between an upper layer and the controller 101. The buffer 104 may be a volatile memory such as a DRAM or a non-volatile memory such as a NAND, or an MRAM. The upper layer stores the frame received from another network in the buffer 104 for relaying to the network in the terminal side belonging to the BSS of itself. The upper layer may take in, from the controller 101, the frame received from the terminal side or a payload thereof via the buffer 104. The upper layer may perform an upper communication process than a MAC layer such as a TCP/IP or a UDP/IP. Alternatively, the TCP/IP or the UDP/IP may be performed in the controller 101 and the upper layer may also perform a process of an application layer of processing the data upper than the TCP/IP or the UDP/IP.

An operation of the upper layer may be performed by software (program) processing by a processor such as a CPU, or may be performed by hardware, or may be performed by the both of the software and the hardware. The controller 101 mainly performs a process of the MAC layer, and a part of a process of a physical layer (e.g., a process concerning OFDMA or the like). The controller 101 transmits and receives the frame via the transmitter 102 and the receiver 103 to control the communication with the terminals. The controller 101 communicates with the adjacent AP via the transmitter 102 and the receiver 103 to exchange information (FFR information) required for cooperation of multiuser transmission such as the DL-OFDMA. The controller 101 periodically transmits a beacon frame for notifying attribute information, synchronization information and the like of the BSS (Basic Service Set) of the AP. The controller 101 may include a clock generator generating a clock to manage an internal time using the clock generated by the clock generator. The controller 101 may output externally the clock created by the clock generator. Alternatively, the controller 101 may receive a clock generated by an external clock generator to manage an internal time using the relevant clock generated.

The controller 101, on receiving an association request from the terminal, performs an association process to exchange required information on capability or an attribute etc. each other and establishes the wireless link with the terminal. The capability information may include information of whether to be capable of DL-OFDMA. The capability information may include information of the RU allocation pattern capable for the terminal, information of the usable RU, and the like. The controller 101 may perform a process such as an authentication process with the terminal if necessary before receiving the association request. The controller 101 periodically checks the buffer 104 to confirm the state of the buffer 104. Alternatively, the controller 101 may check the state of the buffer 104 according to a trigger given from an external device.

The transmitter 102 adds a physical header to a frame to be transmitted to generate a physical packet, and further performs processes of the physical layer such as coding and modulation process. The transmitter 102 subjects the physical packet after being modulated to DA conversion, a filtering process to extract components of a desired band, frequency conversion (up-conversion) and the like to amplify signals obtained through these processes by a pre-amplifier and radiate the amplified signals as radio waves from one or more antennas into the space. The transmitter 102 may acquire from the controller 101 information required for generating a part or all of the physical header. A part or all of the physical header may be added by the controller 101. An exemplary operation in the case of OFDMA transmission is described later.

The signal received by each antenna is, in the receiver 103, amplified by a low noise amplifier (LNA), subjected to frequency conversion (down-convert), and subjected to a filtering process, thereby allowing a desired band component to be extracted.

The extracted signal is further converted into digital signals through AD conversion and subjected to the processes of the physical layer such as demodulation, error-correcting decode, and a process of the physical header, and thereafter, the frame is input to the controller 101. A part or all of the processes of the physical header may be performed by the controller 101. Note that in the case of UL-OFDMA as in another embodiment described later, the signals transmitted from the respective plural terminals are separated for each RU to extract a frame (data frame, ACK frame, or the like) for each terminal.

If the controller 101 receives a frame requiring an acknowledgement response, on the basis of a check result of the received frame, it generates an acknowledgement response frame (ACK frame, BA frame, or the like) and transmits the generated acknowledgement response frame via the transmitter 102. In a case where the frames are transmitted from a plurality of terminals by way of UL-OFDMA described later, the controller 101 may transmit, as the acknowledgement response frame, a Multi-Station BA frame investigated in IEEE802.11ax.

As a first exemplary operation of the AP according to the present embodiment (corresponding to the exemplary operation of the AP 1 in FIG. 12), the controller 101 determines to perform DL-OFDMA at an arbitrary timing. The controller 101 determines the RU allocation pattern (see FIG. 3), and determines the RU for FFR from among a plurality of RUs included in the determined RU allocation pattern. One or more terminals as targets to which DL-OFDMA is to be performed are selected from among terminals (terminals compliant with OFDMA) establishing the wireless link. The controller 101 allocates an RU (RU for FFR or other RU (usual RU)) to the selected terminal. The RU for FFR and the usual RU are allocated here, but only the RU for FFR may be allocated. The selection of the terminal precedes the allocation here, but the RU (RU for FFR, usual RU) may be selected first, and then, the terminal allocated with the RU may be selected.

As an example, the terminal allocated with the RU for FFR is a terminal in the neighbor area, and the terminal allocated with the usual RU is a terminal in the distant area. Which is the terminal belongs to may be determined by any method. For example, the determination may be made by comparing received power from the terminal with a threshold. Alternatively, in a case where the AP is equipped with a GPS (Global Positioning System), it may determine utilizing the GPS. The controller 101 may estimate a distance from the terminal to make the determination on the basis of the estimated distance. However, the RU for FFR may be allocated to a terminal in the distant area (for example, a terminal existing on an opposite side of the adjacent AP and not belonging to the overlap area). The usual RU may be also allocated to a terminal in the neighbor area.

The controller 101 determines the MCS, a packet length (PPDU length or the like), and other parameters with respect to the selected terminals as needed.

The controller 101 transmits the FFR information to the cooperative partner AP via the transmitter 102. The FFR information includes, for example, the FFR-on information (information specifying the RU for FFR), the FFR correspondence information (information associating the identifier of the RU (RU for FFR and usual RU) with the terminal allocation information (STAID or the like) of the terminal allocated with the relevant RU), and the value of the RU allocation pattern.

Once the controller 101 receives the FFR information from the partner AP, it determines execution timing for DL-OFDMA and transmits the DL-MU start notification specifying the execution timing. When the execution timing (predetermined timing) specified in the DL-MU start notification arrives, the controller 101 performs DL-OFDMA. Concretely, the controller 101 sets the terminal allocation information (terminal identifier or the like) of each terminal selected above in a field (Use field) regarding the RU allocated to the relevant terminal. On the basis of the FFR information received from the partner AP, the controller 101 sets the terminal allocation information of the terminal allocated with the usual RU which is used by the partner AP in a field (User field) regarding the relevant usual RU. In the RU allocation Sub-field, the value of the RU allocation pattern is set. In other fields also, values (common to the AP 2) are set to generate the SIG 1 field. The controller 101 transmits the physical packet containing the legacy field, the SIG 1 field, and the MAC frames addressed to the terminals selected above. More specifically, the controller 101 transmits the header containing the legacy field and the SIG 1 field using at the channel width band, and transmits the MAC frames, subsequent to the header, addressed to the selected terminals via the RUs allocated respectively to the terminals. Of a plurality of RUs included in the channel width band, the RU allocated to no terminal by the controller 101 is not used for the transmission.

The RU allocation Sub-field is used to associate the User fields with the RUs here, but the User fields may be directly set to the identifiers of the RUs as a method. This also allows to grasp the correspondence between the terminal and the RU. In this case, with the cooperation of the AP and the partner AP, the identifier of which RU is set (or, which terminal identifier is set) in which position of the User fields may be determined through negotiation between both APs, or a rule for the setting therefor may be defined in advance.

As a second exemplary operation of the AP according to the present embodiment (corresponding to the exemplary operation of the AP 2 in FIG. 12), once the controller 101 receives the FFR information from the partner AP, it determines to perform DL-OFDMA. The controller 101 grasps the RU allocation pattern and the RU for FFR on the basis of the FFR information. The AP selects, as the terminal allocated with the RU for FFR, from among the terminals (terminals compliant with OFDMA) establishing the wireless link, a terminal having a terminal identifier the same as the terminal identifier of the terminal to which the partner AP allocates the same RU for FFR. The AP selects the terminal allocated with the RU not used by the partner AP of the usual RUs as needed. The controller 101 allocates the RU (RU for FFR or usual RU) to each of the selected terminals. There are the terminal allocated with the RU for FFR and the terminal allocated with the usual RU here, but there may be only the terminal allocated with the RU for FFR. The controller 101 determines the MCS, a packet length (PPDU length or the like), and other parameters with respect to the selected terminals as needed. In this case, with respect to the terminal allocated with the RU for FFR, determined are values the same as those for the terminal to which the partner AP allocates the relevant RU for FFR. The controller 101 transmits the FFR information to the cooperative partner AP via the transmitter 102. The FFR information includes information associating the identifier of the usual RU with the terminal allocation information (STAID or the like) of the terminal allocated with the usual RU.

Once the controller 101 receives the DL-MU start notification from the partner AP, it performs DL-OFDMA when the execution timing specified by the DL-MU start notification (predetermined timing) arrives. Concretely, the controller 101 sets the terminal allocation information (terminal identifier or the like) of each terminal selected above in a field (Use field) regarding the RU allocated to the terminal. On the basis of the FFR information received from the partner AP, the controller 101 sets the terminal allocation information of the terminal allocated with the RU (usual RU) which is used by the partner AP in a field (User field) regarding the relevant usual RU. In the RU allocation Sub-field, the value of the above RU allocation pattern is set. In other fields also, values (common to the AP 1) are set to generate the SIG 1 field. The controller 101 transmits the physical packet containing the legacy field, the SIG 1 field, and the MAC frames addressed to the terminals selected above. More specifically, the controller 101 transmits the header containing the legacy field and the SIG 1 field using at the channel width band, and transmits the MAC frames, subsequent to the header, addressed to the selected terminals via the RUs allocated respectively to the terminals. Of a plurality of RUs included in the channel width band, the RU allocated to no terminal by the controller 101 is not used for the transmission.

The controller 101 may access a storage device for storing the information to be transmitted to the terminal or the information received from the terminal, or the both of these to read out the information. The storage device may be an internal memory device, an external memory device, a volatile memory device, or a non-volatile memory device. The storage device may also be an SSD, a hard disk or the like other than the memory.

The above described isolation of the processes of the controller 101 and the transmitter 102 is an example, and another form may be used. For example, the controller 101 may perform the process until the digital region process and the DA conversion, and the transmitter 102 may perform process subsequent to the DA conversion. As for the isolation of the processes of the controller 101 and the receiver 103, similarly, the receiver 103 may perform the process before the AD conversion and the controller 101 may perform the digital region process including processes following the AD conversion. As an example, the baseband integrated circuitry in accordance with the present embodiment corresponds to the section that carries out the processing of the physical layer and the section that carries out the processing of the DA conversion in the controller 101 and the transmitter 102, and the section that carries out the processing processes including and following the AD conversion in the receiver 103. The RF integrated circuitry corresponds to the section that carries out the processing processes following the DA conversion in the transmitter 102, and the section that carries out the processing processes prior to the AD conversion in the receiver 103. The integrated circuitry for the wireless communication in accordance with the present embodiment includes at least a baseband integrated circuitry from the baseband integrated circuitry and the RF integrated circuitry. The processing processes between blocks or processing processes between the baseband integrated circuitry and the RF integrated circuitry may be isolated from each other in accordance with any method other than those described herein.

Figure 13B:
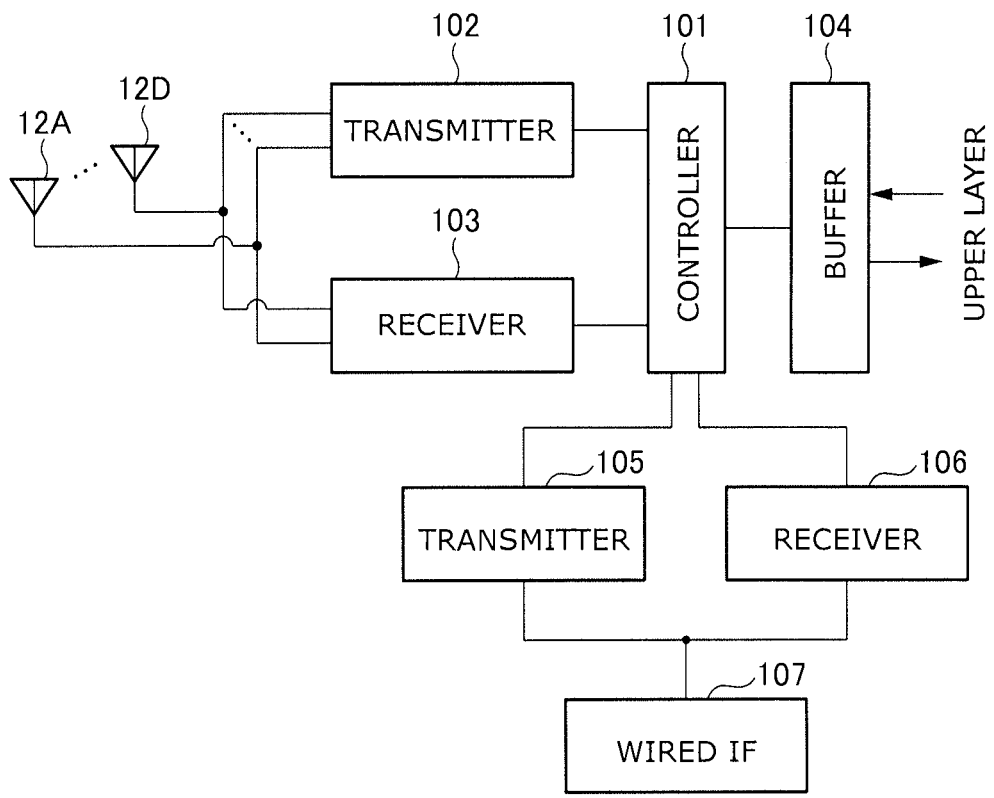
FIG. 13B is another block diagram of the AP according to the first embodiment.

FIG. 13A shows the configuration in the case where the communication between the APs is performed using the same communication scheme as the terminal, but the communication between the APs may be performed using another scheme such as the wired communication. An exemplary configuration in that case is shown in FIG. 13B. There are provided a transmitter 105 and a receiver 106 for the communication between the APs. A wired IF 107, which is connected to the wired network, outputs a signal of a frame or packet received from the transmitter 105 to the wired network and transfers a signal of a frame or packet received from the wired network to the receiver 106. The transmitter and the receiver 106 basically operate similar to the transmitter 105 and the receiver 106 except for an operation depending on a protocol. For example, the transmitter 105 subjects the frame or packet transferred from controller 101 to modulation, DA conversion, filtering process, frequency conversion, amplification and the like, and outputs the signal after being amplified to the wired IF 107. The receiver 106 subjects the signal received from the wired IF 107 to amplification, frequency conversion, filtering process, AD conversion, demodulation and the like to acquire the frame or the packet, and transfers the acquired frame or packet to the controller 101.

Figure 14:
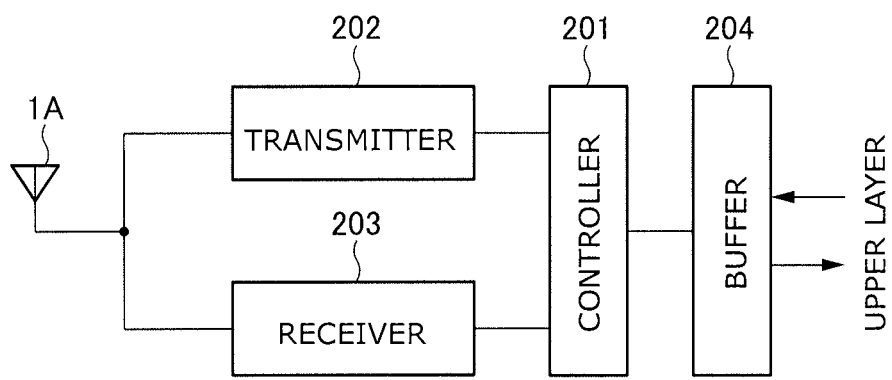
FIG. 14 is a block diagram of a terminal according to the first embodiment.

FIG. 14 is a functional block diagram of the wireless communication device equipped in the terminal. The wireless communication device equipped in the terminals 11 to 16, 21 to 23, 27 to 29 in FIG. 1 has this configuration.

The wireless communication device includes a controller 201, a transmitter 202, a receiver 203, at least one antenna 1, and a buffer 204. The controller 201 corresponds to controlling circuitry or a baseband integrated circuitry which controls communication with the AP, and the transmitter 202 and the receiver 203 form a wireless communicator or an RF integrated circuitry which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of software and hardware. The terminal may include a processor performing the process of the controller 201, all or a part of the transmitter 202 and the receiver 203.

The buffer 204 is a storage for transferring a frame and the like between an upper layer and the controller 201. The buffer 204 may be a volatile memory such as a DRAM or a non-volatile memory such as a NAND, or an MRAM. The upper layer generates the frames to be transmitted to other terminals and APs or other devices on the network such as a server and stores the generated frames in the buffer 204, or receives, from the controller 201 via the buffer 204, the frames received from other terminals, APs and devices. The upper layer may perform an upper communication process than a MAC layer such as a TCP/IP or a UDP/IP. The TCP/IP or the UDP/IP may be performed in the controller 201 and the upper layer may perform a process of an application layer of processing the data upper than the TCP/IP or the UDP/IP. An operation of the upper layer may be performed by software (program) processing by a processor such as a CPU, or may be performed by hardware, or may be performed by the both of the software and the hardware.

The controller 201 mainly performs a process of the MAC layer. The controller 201 transmits and receives the frames via the transmitter 202 and the receiver 203 to and from the AP to control the communication with the AP. The controller 201 may include a clock generator generating a clock to manage an internal time using the clock generated by the clock generator. The controller 201 may output externally the clock created by the clock generator. Alternatively, the controller 201 may receive a clock generated by an external clock generator to manage an internal time using the relevant clock generated.

The controller 201, as an example, receives the beacon frame to grasp the attribute and synchronization information of BSS of the AP and then transmits an association request to the AP to perform an association process in response to the received beacon. Thereby, the controller 201 exchanges required information on capability or an attribute etc. each other (which may include capability information of whether to be capable of OFDMA) and establishes the wireless link with the AP. The controller 201 may perform a process such as an authentication process if necessary before the association process. The controller 201 periodically checks the buffer 204 to confirm the state of the buffer 204. Alternatively, the controller 201 may check the state of the buffer 204 according to a trigger given from an external device. Once the controller 201 confirms the existence of the frame such as the data frame to be transmitted to the AP, it may transmit, after acquiring the access right to the wireless medium (transmission right) in accordance with the CSMA/CA or the like, the relevant frame via the transmitter 202 and the antenna 1A.

The transmitter 202 adds a physical header to a frame input from the controller 201 to generate a physical packet, and further performs physical processing such as coding and modulation process. The transmitter 202 subjects the physical packet after being modulated to DA conversion, a filtering process to extract components of a desired band, frequency conversion (up-conversion) and the like to amplify signals obtained through these processes by a pre-amplifier and radiate the amplified signals as radio waves from one or more antennas into the space. In the case where a plurality of antennas are provided, a transmission system may be provided for each antenna such that the process of the physical layer is performed for each transmission system to simultaneously transmit the same signals. A plurality of antennas may be used to control the directivity for transmission. The transmitter 202 may acquire from the controller 201 information required for generating a part or all of the physical header. A part or all of the physical header may be added by the controller 201.

The signal received by the antenna 1A is processed in the receiver 203. The received signal is amplified in the receiver 203 by the LNA, subjected to frequency conversion (down-conversion) and a filtering process to extract components of the desired band. The extracted signal is further converted into digital signals through AD conversion and subjected to the processes of the physical layer such as demodulation, error-correcting decode, and a process of the physical header, and thereafter, the frame such as a data frame is input to the controller 201. A part or all of the processes of the physical header may be performed by the controller 201.

Once the receiver 203 receives a signal transmitted by way of DL-OFDMA from the AP, it detects a value indicating the RU allocation pattern from the RU allocation Sub-field in the SIG 1 field in the physical header. The receiver checks whether the terminal identifier of the terminal of itself is set in any of a plurality of User fields, if so, it identifies the RU regarding that User field on the basis of the RU allocation pattern. The receiver 203 decodes the signal of the identified RU to acquire the frame and transfers the acquired frame to the controller 201. If the transferred frame is a frame requiring an acknowledgment response, the controller 201 generates an acknowledgement response frame on the basis of a check result of the frame and transmits the acknowledgement response frame. The acknowledgement response frame may be transmitted by way of the single-user transmission or by way of the multiuser transmission (UL-OFDMA, UL-MU-MIMO or the like) with other terminals. The single-user transmission may be performed after elapse of a predetermined certain time period from receiving the frame, or by performing the carrier sense and a back-off operation in accordance with the CSMA/CA to acquire the access right with respect to the wireless medium. A part of DL-OFDMA signal reception process described here may be performed by the controller 201.

The controller 201 may access a storage device that stores either information to be notified to the AP or the information notified from the AP or both of these pieces of information and read the information. The storage device may be an internal memory device, an external memory device, a volatile memory device, or a non-volatile memory device. The storage device may also be an SSD, a hard disk or the like other than the memory.

The above described isolation of the processes of the controller 201 and the transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion. As an example, the baseband integrated circuitry in accordance with the present embodiment corresponds to the section that carries out the processing of the physical layer and the section that carries out the processing of the DA conversion in the controller 201 and the transmitter 202, and the section that carries out the processing processes including and following the AD conversion in the receiver 203. The RF integrated circuitry corresponds to the section that carries out the processing processes following the DA conversion in the transmitter 202, and the section that carries out the processing processes prior to the AD conversion in the receiver 203. The integrated circuitry for the wireless communication in accordance with the present embodiment includes at least a baseband integrated circuitry from the baseband integrated circuitry and the RF integrated circuitry. The processing processes between blocks or processing processes between the baseband integrated circuitry and the RF integrated circuitry may be isolated from each other in accordance with any method other than those described herein.

Figure 15A:
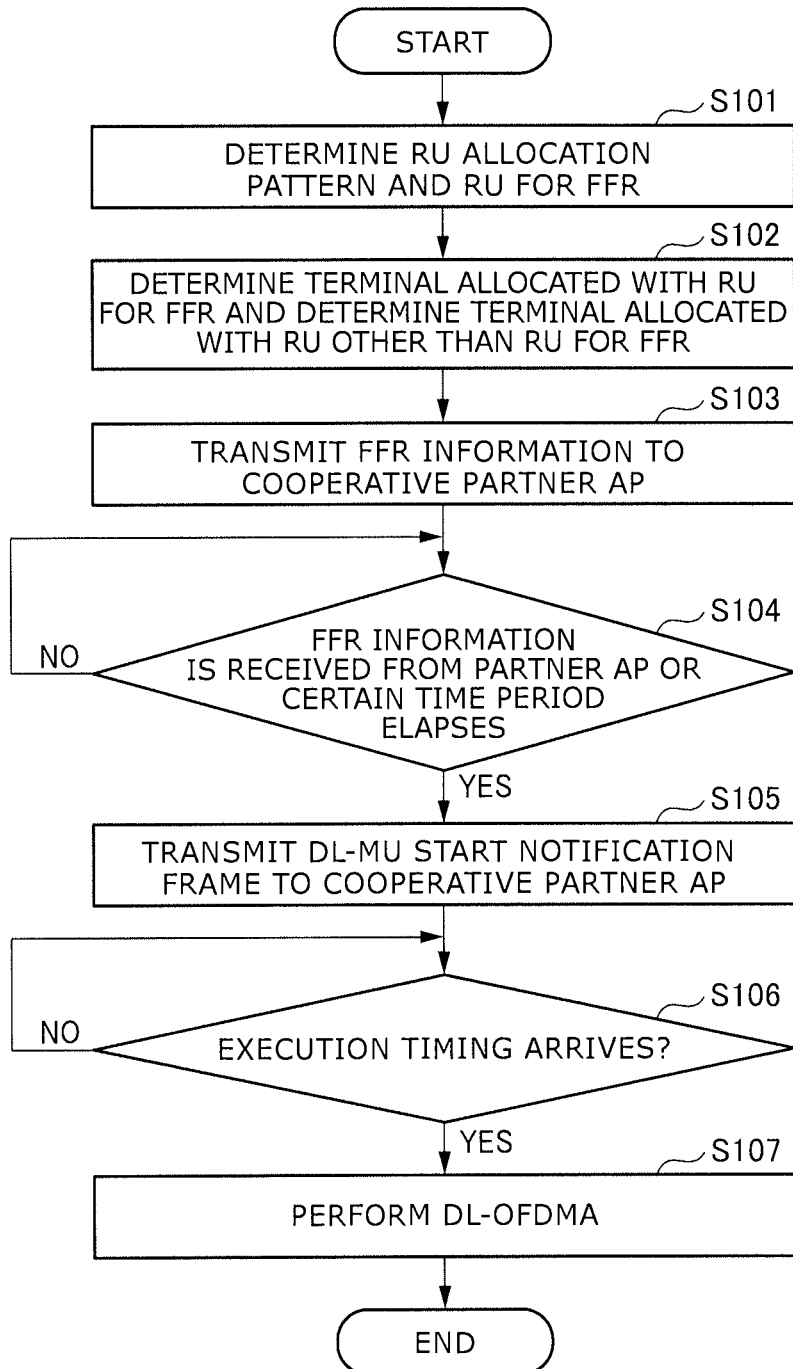
FIG. 15A is a flowchart of an operation of the AP according to the first embodiment.

FIG. 15A is a flowchart of a first exemplary operation of the AP according to the first embodiment (corresponding to the operation of the AP 1 in FIG. 12).

The AP determines to perform DL-OFDMA at an arbitrary timing, and then, determines the RU allocation pattern to be used (see FIG. 3) and determines the RU for FFR from among a plurality of RUs corresponding to the RU allocation pattern (S101).

The AP selects one or more terminals as targets to which DL-OFDMA is to be performed from among terminals establishing the wireless link (S102). Also, the AP allocates one or more RUs (at least the RU for FFR of the RU for FFR and the usual RU) to the terminals (S102 also).

The AP determines the MCS, the packet length (PPDU length or the like), and other parameters with respect to the selected terminals as needed.

The AP transmits as the FFR information, to the cooperative partner AP, the FFR-on information (identifier of the RU for FFR), the FFR correspondence information (information associating the identifier of the RU with the terminal allocation information (STAID or the like) of the terminal allocated with the relevant RU), and the value of the RU allocation pattern (S103).

Once the AP receives the FFR information from the partner AP or after a certain time period elapses (S104), the AP transmits the DL-MU start notification frame specifying the execution timing for DL-OFDMA (S105). The DL-MU start notification frame is assumed to be a control frame, but may be a management frame or a data frame. When the execution timing (predetermined timing) specified in the DL-MU start notification arrives (S106), the AP performs DL-OFDMA (S107).

Concretely, the AP sets the terminal allocation information (terminal identifier or the like) of each terminal selected above in a field (Use field) regarding the RU allocated to the relevant terminal. On the basis of the FFR information received from the partner AP, the AP sets the terminal allocation information of the terminal allocated with the RU (usual RU) which is used by the partner AP in a field (User field) regarding the relevant usual RU. In the RU allocation Sub-field, the value of the RU allocation pattern is set. In other fields in the SIG 1 field also, values (common to the AP 2) are set. The AP transmits the physical packet containing the legacy field, the SIG 1 field, and the MAC frames addressed to the terminals selected above. More specifically, the AP transmits the header containing the legacy fields and the SIG 1 field using at the channel width band, and transmits the MAC frames, subsequent to the header, addressed to the terminals via the RUs allocated respectively to the terminals. Of a plurality of RUs included in the channel width band, the RU allocated to no terminal by the AP is not used for the transmission.

Figure 15B:
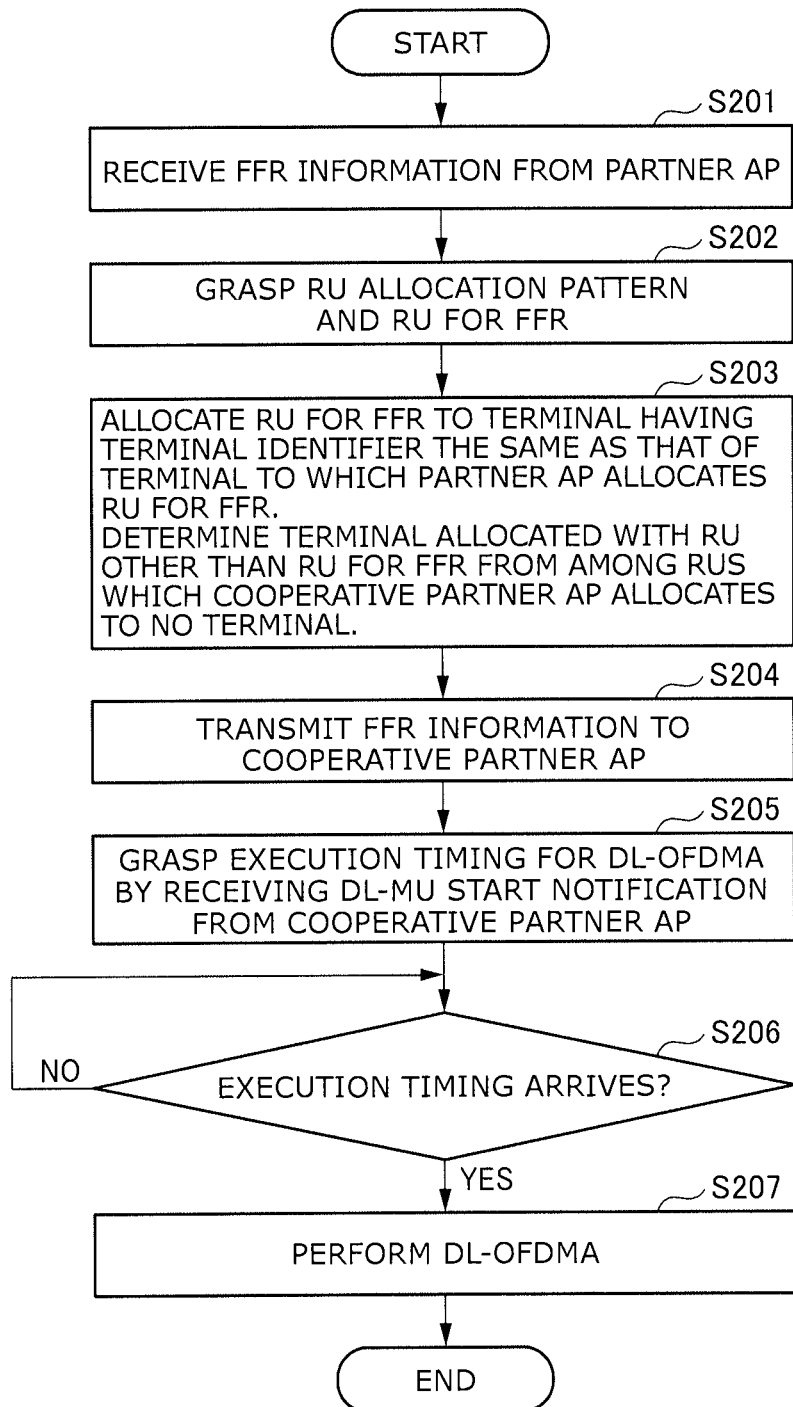
FIG. 15B is a flowchart of another operation of the AP according to the first embodiment.

FIG. 15B is a flowchart of a second exemplary operation of the AP according to the first embodiment (corresponding to the operation of the AP 2 in FIG. 12).

Once the AP receives the FFR information from the partner AP, it determines to perform DL-OFDMA (S201).

The AP grasps the RU allocation pattern and the RU for FFR on the basis of the FFR information (S202).

The AP selects, as the terminal allocated with the RU for FFR, from among the terminals (terminals compliant with OFDMA) establishing the wireless link, a terminal having a terminal identifier the same as the terminal identifier of the terminal to which the partner AP allocates the same RU for FFR (S203). The AP selects the terminal allocated with the RU not used by the partner AP of the usual RUs as needed (S203 also).

The AP determines the MCS, the packet length (PPDU length or the like), and other parameters with respect to the selected terminals as needed. In this case, with respect to the terminal allocated with the RU for FFR, determined are values the same as those for the terminal to which the partner AP allocates the same RU for FFR. The AP transmits as the FFR information, to the cooperative partner AP, information associating the identifier of the usual RU to be used with the terminal allocation information of the terminal allocated with the relevant usual RU (S204).

The AP grasps the execution timing for DL-OFDMA by receiving the DL-MU start notification frame from the partner AP (S205). When the execution timing (predetermined timing) specified in the DL-MU start notification arrives (S206), the AP performs DL-OFDMA (S207).

Concretely, the AP sets the terminal allocation information (terminal identifier or the like) of each terminal selected above in a field (Use field) regarding the RU allocated to the terminal. On the basis of the FFR information received from the partner AP, the AP sets the terminal allocation information of the terminal allocated with the RU (usual RU) which is used by the partner AP in a field (User field) regarding the relevant usual RU. In the RU allocation Sub-field, the value of the above RU allocation pattern is set. In other fields also, values (common to the AP 1) are set to generate the SIG 1 field the same as the partner AP. The AP transmits the physical packet containing the legacy field, the SIG 1 field, and the MAC frames addressed to the terminals selected above. More specifically, the AP transmits the header containing the legacy field and the SIG 1 field using at the channel width band, and transmits the MAC frames, subsequent to the header, addressed to the terminals via the RUs allocated respectively to the terminals. Of a plurality of RUs included in the channel width band, the RU allocated to no terminal by the AP is not used for the transmission.

As described above, according to the present embodiment, the AP 1 and the AP 2 cooperate with each other to perform the FFR such that the AP 1 and the AP 2 can use the same channel to perform DL-OFDMA with the high frequency usage efficiency. In other words, both the AP 1 and the AP 2 allocate the RU for FFR used by both the AP 1 and the AP 2 to the terminals having the same STAID such that the contents of the physical header parts (SIG 1 fields and the like) can be identical between the AP 1 and the AP 2. By doing so, the terminal receiving the signals from both the AP 1 and the AP 2 can also decode the header part, and thus, can correctly receive the frame transmitted by way of DL-OFDMA from the AP to which the terminal itself belongs.

In this way, FFR for using the same RU by a plurality of APs at the same time can be achieved in a wireless LAN system.

The present embodiment shows the example in which the FFR is performed between two APs, but the FFR can be performed also between three APs. In this case, the FFR information is exchanged between three APs to cooperate with each other, achieving the FFR similarly to the present embodiment. The same holds for a second embodiment and third embodiment described later.

Second Embodiment

In the first embodiment, FFR (Fractional Frequency Ruse) is performed by way of DL-OFDMA, but in the second embodiment, the FFR is performed by way of UL-OFDMA. In the case of UL-OFDMA, the AP transmits a frame specifying a plurality of terminal to perform UL-OFDMA and RUs used by these terminals (hereinafter, referred to as a trigger frame: TF). A plurality of terminals receiving the TF transmit at a predetermined same timing respectively the MAC frames such the data frame (more specifically, the physical packets containing the MAC frames) via the specified RUs. This allows UL-OFDMA to be performed.

Similar to the first embodiment, assume the case where the AP 1 allocates the RU #1 to the RU #6 to the terminals 11 to 16, and the AP 2 allocates the RU #1 to the RU #3 and the RU #7 to the RU #9 to the terminals 21 to 23 and 27 to 29 (see FIG. 5).

FIG. 16 shows an exemplary format of the TF. The TF is defined based on a format of a general MAC frame. The TF includes a Frame Control field, a Duration/ID field, an Address 1 field, an Address 2 field, a COMMOM Info field (common information field), and a plurality of Per User Info fields (terminal information fields).

As an example, the Type of the Frame Control field may be a value indicating "control" and a value of the Subtype may be a value newly defined for the TF. However, the frame type of the TF may be configured to indicate not "control" but "management" or "date" non-exclusively.

In the Address 1 field, a broadcast address or a multicast address is set as the RA (Receiver Address), as an example. In the Address 2 field, the MAC address of the AP or the BSSID is set as the TA (Transmitter Address).

In the COMMOM Info field, information notified commonly to a plurality of terminals selected as the targets for UL-OFDMA is set. As an example, the information includes a duration of the frame to be uplink-transmitted or physical packet, classification of the frame to be uplink-transmitted, a length of an L-SIG field in a physical header added to the frame to be uplink-transmitted, and the like. Moreover, timing information of the uplink transmission may be set.

In each Per User Info field, information individually notified to the terminal is set. For example, the terminal identifier (STAID) of the terminal specified as the target for UL-OFDMA, the identifier of the RU allocated to the terminal, and the like are set. Additionally, information specifying the MCS applied to the frame to be uplink-transmitted may be set. If the each Per User Info field is associated with the particular RU, the identifier of the RU may be configured to be omitted.

(First Exemplary Operation in Second Embodiment: Transmitting the Same Trigger Frame from Both APs Using Setting for Virtual AP)

Figure 17:
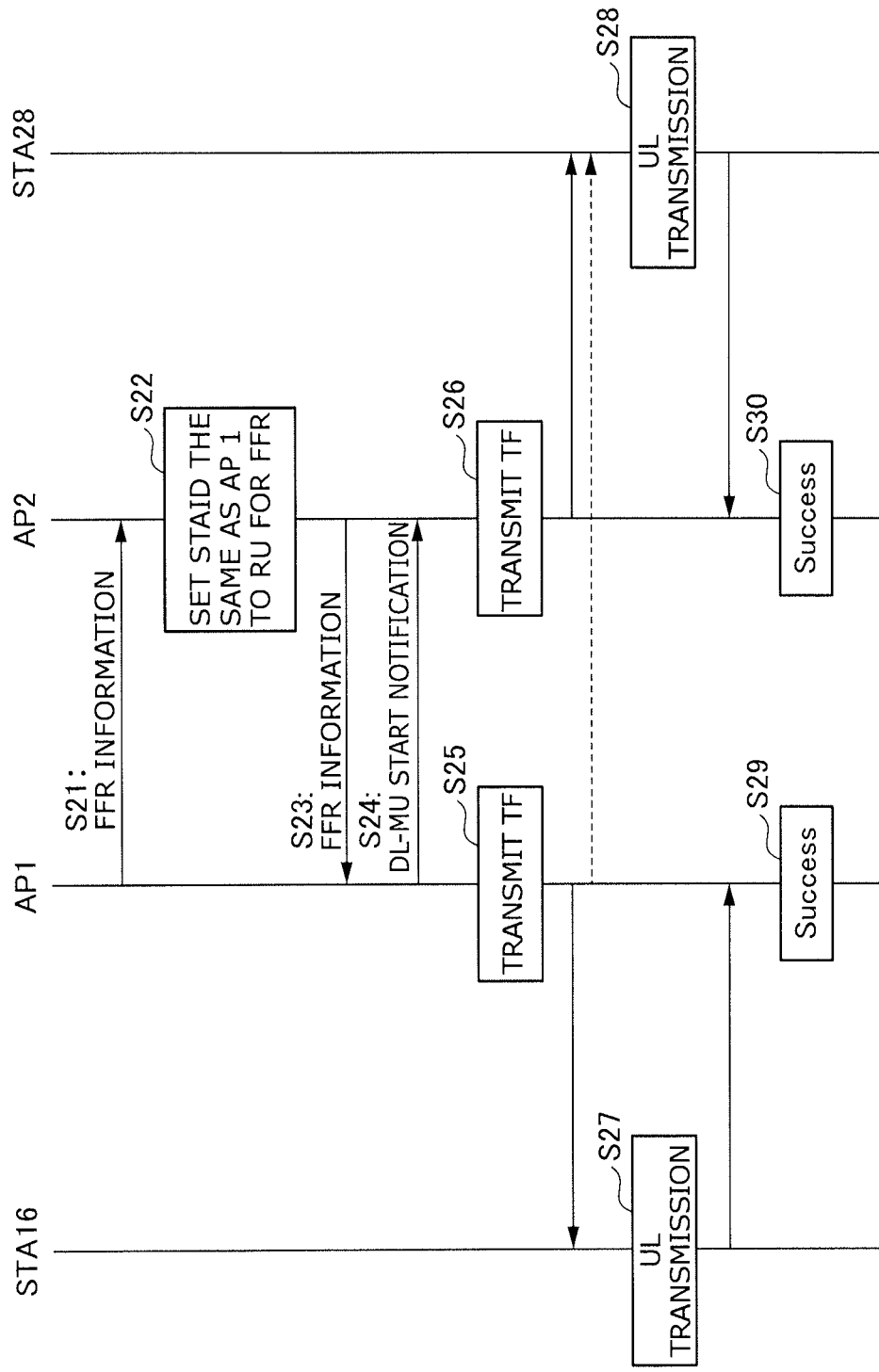
FIG. 17 is a diagram showing an exemplary setting for a Virtual AP.
Figure 18:
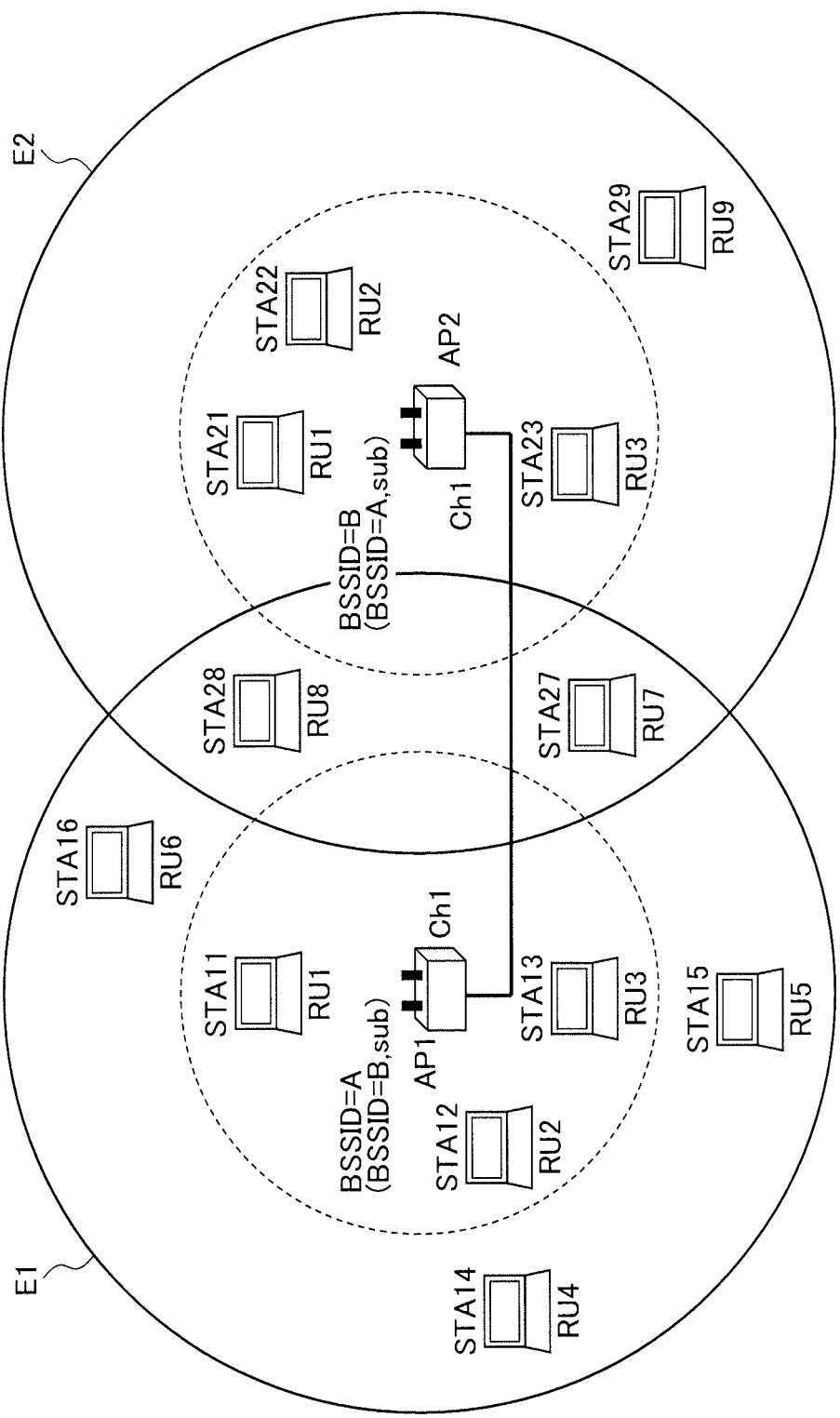
FIG. 18 is a diagram showing an operation sequence of a wireless LAN system according to a second embodiment.

FIG. 17 shows an exemplary operation sequence of a wireless LAN system according to the present embodiment. Assume that each of the AP 1 and the AP 2 is set to a setting of a Virtual AP capable of setting a plurality of BSSIDs. Concretely, as shown in FIG. 18, the AP 1 is set to have a BSSID of the AP 1 itself (which is "A") as well as a BSSID of the AP 2 (which is "B") as a sub-BSSID. Similarly, the AP 2 is set to have the BSSID of the AP 2 itself (which is "B") as well as the BSSID of the AP 1 (which is "A") as a sub-BSSID. Each of the terminals belonging to the AP 1 and the AP 2 notifies to the AP whether or not it is capable of receiving, as the capability information, a frame whose Address 2 field (TA field) is set to a BSSID of an AP other than the AP (BSS) connected to the terminal itself. The terminal notifying its capability of reception can receive the frame whose TA field is set to the BSSID of the adjacent AP. Here, assume that the terminals 11 to 16 notify their capabilities of reception to the AP 1, and the terminals 21 to 23 and 27 to 29 notify their capabilities of reception to the AP 2. This notification may be made by setting the capability information in an association request frame transmitted in the association or may be made using other frame such as a probe search frame.

The AP 1 and the AP 2 cooperate with each other to grasp the RU for FFR such that each of them acquires the terminal allocation information of the terminal allocated with the usual RU from the partner AP.

More specifically, the AP 1 determines the RU #1 to the RU #3 as the RUs for FFR and allocates them respectively to the terminals 11 to 13. Further, the AP 1 allocates the RU #4 to the RU #6 as the usual RUs respectively to the terminals 14 to 16. The AP 1 transmits as the FFR information, to the AP 2, information (FFR-on information) specifying the RU for FFR (the RU #1 to the RU #3), and FFR correspondence information associating the RU #1 to the RU #6 with the terminal allocation information (STAID or the like) of the terminals (S21). The AP 1 and the AP 2 may share in advance a rule concerning a correspondence relationship between a Per User Info 1 to a Per User Info N and the RUs in the trigger frame (TF). For example, a rule is shared between the APs that the Per User Info 1 corresponds to the RU #1 and the Per User Info 2 corresponds to the RU #2. As way to share, one of the AP 1 and the AP 2 may determine a rule and notify the rule to the other AP. Alternatively, a rule may be defined in the specification or the standard.

The AP 2 grasps that the RU #1 to the RU #3 are the RUs for FFR on the basis of the FFR-on information included in the FFR information received from the AP 1. The AP 2 allocates the RU #1 to the RU #3 respectively to the terminals 21 to 23 having the STAIDs (the ID 1 to the ID 3) the same as the AP 1 on the basis of the FFR correspondence information (S22). The AP 2 allocates the RU #7 to the RU #9 not used by the AP 1 respectively to the terminal 27 to the terminal 29 having the ID 7 to the ID 9 as the STAIDs. The AP 2 transmits as the FFR information, to the AP 1, information associating the RU #7 to the RU #9 with the terminal allocation information (STAID or the like) of the terminals allocated with these RUs (S23).

The AP 1 transmits a UL-MU (Uplink Mufti-User) start notification frame specifying execution timing for UL-OFDMA to the AP 2 (S24).

When the execution timing for UL-OFDMA arrives, the AP 1 and the AP 2 simultaneously transmit the TFs respectively (S25, S26). More specifically, the AP 1 sets the Per User Info 1 to the Per User Info 6 in the TF to the terminal allocation information (STAIDs) of the terminals 11 to 16 and the RU identifiers, and sets the Per User Info 7 to the Per User Info 9 to the terminal allocation information of the terminals 27 to 29 and the RU identifiers acquired from the AP 2. In other fields in the TF also, required information is set. This allows the TF (hereafter, referred as a TF 1) to be generated. Then, the AP 1 transmits the generated TF 1. More accurately, the AP 1 transmits the physical packet having the physical header including the legacy field (L-STF, L-LTF, and L-SIG) added to the TF 1. The physical header and the TF 1 are transmitted at the channel width band (e.g., 20 MHz). Another field may be added between the legacy field and the TF 1 in the physical header.

The AP 2 sets the Per User Info 1 to the Per User Info 3, the Per User Info 7 to the Per User Info 9 in the TF respectively to the terminal allocation information (STAID or the like) of the terminals 21 to 23 and 27 to 29 and the RU identifiers, and sets the Per User Info 4 to the Per User Info 6 respectively to the terminal allocation information of the terminals 14 to 16 and the RU identifiers acquired from the AP 1. In the Address 2 field, not the BSSID (MAC address) of the AP 2 but the BSSID (MAC address) of the AP 1 is set. In other fields also, required information is set. This allows the TF (hereafter, referred as a TF 2) to be generated. In this case, other fields are also set similar to the TF 1 (for this purpose, the information may be exchanged between the AP 1 and the AP 2 as needed). This allows values of all fields of the TF 2 be the same as those of the TF 1. The AP 2 transmits the generated TF 2. More accurately, the AP 2 transmits the physical packet having the physical header including the legacy field (L-STF, L-LTF, and L-SIG) added to the TF 2. The physical header and the TF 2 are transmitted at the channel width band (e.g., 20 MHz). Similar to the TF 1, another field may be added between the legacy field and the TF 2 in the physical header. In this case, the added field is also made to have the same value as that added in the AP 1. For this purpose, the information may be exchanged in advance between the AP 1 and the AP 2 as needed.

Each of the terminals 11 to 16 receives the TF 1 transmitted from the AP 1 and confirms the TA set in the Address 2 field to determine that a sender is the AP 1 (that is, the TF 1 is a frame the terminal itself is to receive). Each of the terminals 11 to 16 identifies the Per User field set to the STAID of the terminal itself and detects the information such as the RU used for the uplink transmission from the identified field. Each of the terminals 11 to 16 transmits, after elapse of a predetermined time period from receiving the TF 1, the MAC frames such the data frame (more specifically, the physical packet having the physical header added to the MAC frames) via the specified RU (S27). The physical header contains the legacy field and the SIG 1 field. In the SIG 1 field, any control information notified to the AP 1 is set. The format of the SIG 1 field may be different from the format of the SIG 1 field in the physical packet subjected to DL-OFDMA transmission in the first embodiment. FIG. 19A shows a physical packet transmitted from the terminals 11 to 16. This allows UL-OFDMA to be performed between the AP 1 and the terminals 11 to 16.

On the other hand, each of the terminals 21 to 23 and 29 receives the TF 2 transmitted from the AP 2 and confirms the TA set in the Address 2 field. Each terminal determines that although the sender AP is found from the TA to be different from the AP the terminal itself belongs to, the TF 2 is a frame the terminal is to receive based on the setting of the Virtual AP. Each of the terminals 21 to 23 and 29 identifies the Per User field set to the STAID of the terminal itself and detects the information such as the RU used for the uplink transmission from the identified field. Each of the terminals 21 to 23 and 29 transmits, after elapse of a predetermined time period from receiving the TF 2, the MAC frames such the data frame (more specifically, the physical packet having the physical header added to the MAC frames) via the specified RU (S28). On the other hand, the terminals 27 and 28 simultaneously receive the TF 1 transmitted from AP 1 and the TF 2 transmitted from the AP 2, but the physical headers of these TFs are identical and the contents of the TF 1 and the TF 2 are identical. This allows the terminals 27 and 28 to correctly decode the received signals. Therefore, each of the terminals 27 and 28, similar to the terminals 21 to 23 and 29, detects the RU specified to the terminal itself and the like, and transmits the MAC frame (more specifically, the physical packet having the physical header added to the MAC frames) via the specified RU. The physical header contains the legacy field and the SIG 1 field. FIG. 19B shows a physical packet transmitted from the terminals 21 to 23 and 27 to 29. This allows UL-OFDMA to be performed between the AP 2 and the terminals 21 to 23 and 27 to 29.

The AP 1 may receive the uplink signals from the terminals not belonging to the AP 1 itself, for example, the terminals 27 and 28 in the overlap area, but the reception operation in the AP 1 causes no problem because AP 1 does not use the RU #8 and the RU #9 used by these terminals 27 and 28. The AP 2 may also receive the signal from the terminal 16, the terminal 15 or the like depending on the location of the terminal, but no problem is caused because the AP 2 does not use the RU #5, the RU #6 or the like used by the terminal 16, the terminal 15 or the like.

(Second Exemplary Operation in Second Embodiment: Transmitting Trigger Frames Different from Each Other from Both APs Using Channel-Based DL-OFDMA)

In the exemplary operation described above, the FFR information is exchanged between the AP 1 and the AP 2, and the BSSID of the AP 1 is used as the TA of the trigger frame generated by the AP 2 such that the TF 1 and the TF 2 generated respectively by the AP 1 and the AP 2 are made to be the identical frames. This allows the terminal receiving the TF 1 and the TF 2 at the same time even to normally receive the TF 1 or the TF 2. As another method, the AP 1 and the AP 2 may respectively transmit the trigger frames different from each other using channel-based DL-OFDMA. In the channel-based OFDMA, a plurality of channels (e.g., four channels of Ch1, Ch2, Ch3, and Ch4) are simultaneously used to perform the transmission or the reception. The terminal stands by at each of a plurality of channels. In this case, the Virtual AP with respect to each of the AP 1 and the AP 2 is not required.

Similar to the above, the FFR information is exchanged between the AP 1 and the AP 2. Both APs determine the channels different from the other which are used for the channel-based DL-OFDMA. For example, the AP 1 determines to use the channels 1 and 2, and the AP 2 determines to use the channels 3 and 4.

The AP 1 generates a TF (hereinafter, referred to as a TF 11) in which the Per User Info 1 to the Per User Info 6 are set to the terminal allocation information (STAID or the like) of the terminals 11 to 16, the RU identifiers, and the like. A TA of the TF 11 is the BSSID of the AP 1. The AP 2 generates a TF (hereinafter, referred to as a TF 12) in which the Per User Info 1 to the Per User Info 6 are set to the terminal allocation information of the terminals 21 to 23, and 27 to 29, the RU identifiers, and the like. A TA of the TF 12 is the BSSID of the AP 2. However, in the case where the Per User Info field is not set to the RU identifier but to a correspondence relationship between the relevant field and RU, the terminal allocation information of each terminal is set in the Per User Info field corresponding to the RU allocated to the terminal.

As for the RU allocation by the AP 1 and the AP 2, similar to the above embodiments, the terminal in the neighbor area of the AP 1 and the terminal in the neighbor area of the AP 2 are allocated with the RU (RU for FFR) the same between both APs as an example. The terminal in the distant area of the AP 1 and the terminal in the distant area of the AP 2 are allocated with the usual RUs different between the AP 1 and the AP 2 (such that the RUs do not overlap between the APs).

By doing so, the signals transmitted from the respective neighbor areas of the AP 1 and the AP 2 do not reach the partner AP (or, the received power is low even if the signals reach), and therefore, each AP can correctly receive the frame from the terminal belonging to the AP itself in its neighbor area. As for the signals transmitted from the respective distant areas of the AP 1 and the AP 2, even if the signals reach the partner AP, because the RU (usual RU) used by each AP is different from that of its partner AP, no problem is caused in decoding the frame received from the terminal belonging to the AP itself in its distant area.

The AP 1 transmits, for example, the TF 11 using the channel 1 and an arbitrary frame (which may be a frame the same as the TF 11 or a data frame addressed to an terminal in the neighbor area A1) using the channel 2. The TF 11 is a frame to instruct to perform UL-OFDMA using the channel 1. On the head side of each of these frames, added is the physical header containing the legacy field, the SIG 1 field and the like. In the SIG 1 fields at the channels 1 and 2, each of fields (subfields) for the channels 1 to 4 is set to an allocation target to be allocated with the channel, for example. The allocation target may be the STAIDs of a plurality of terminals each of which is a receiver of the TF transmitted using the corresponding channel. In the case of the broadcast, an ID defined for broadcast (referred to as a broadcast ID) may be adopted. In the case of the broadcast ID, all terminals are the receivers of the TF. Here, assume that the terminal identifiers (or the broadcast IDs) of the terminals 11 to 16 are set as the allocation targets of the channels 1 and 2, and the terminal identifiers (or the broadcast IDs) of the terminals 21 to 23 and 27 to 29 are set as the allocation targets of the channels 3 and 4 (note that the AP 1 grasps the allocation targets of the channels 3 and 4 from the FFR information acquired from the AP 2). The channels 3 and 4 may also be used to transmit the legacy field and the SIG 1 field the same as the channels 1 and 2. FIG. 20A shows an exemplary physical packet the AP 1 transmits. Here, the channels 1 and 2 are used to transmit the same TF 11. The channels 3 and 4 are used to transmit the legacy field and the SIG 1 field the same in their contents as the channels 1 and 2. Here, in the SIG 1 field, each of fields (subfields) for the channels 1 to 4 is set to the allocation target of the channel, which is an example however, may be configured to not include such information. Information required for decoding the payload should be included. The AP 1 transmits the same SIG 1 field using the channels 1 to 4, but such a limitation is not required so long as the terminal can receive independently for each channel.

Similarly, the AP 2 transmits the TF 12 using the channel 3 and an arbitrary frame (which may be a frame the same as the TF 12 or a data frame addressed to a terminal in the neighbor area B1) using the channel 4. The TF 12 is a frame to instruct to perform UL-OFDMA using the channel 1. On the head side of each of these frames, added is the physical header containing the legacy field, the SIG 1 field and the like. The legacy field and the SIG 1 field are the same as those transmitted by the AP 1. In order to achieve this, a rule for setting the terminal identifier in each of fields for the channels 1 to 4 in the SIG 1 field is shared in advance between the AP 1 and the AP 2. FIG. 20B shows an exemplary physical packet the AP 2 transmits. Here, the channels 3 and 4 are used to transmit the same TF 12. The channels 1 and 2 are used to transmit the legacy field and the SIG 1 field the same in their contents as the channels 3 and 4. The AP 2 transmits the same SIG 1 field using the channels 1 to 4, but such a limitation may not be required so long as the terminal can receive independently for each channel.

The terminals 11 to 16 belonging to the AP 1 stand by, for example, at the channels 1 to 4, and then, decodes and analyzes the TF 11 received using the channel 1 or 2 so as to detect the RUs allocated to the terminals themselves to perform UL-OFDMA transmission (see FIG. 19A). If a data frame addressed to any terminal is transmitted using the channel 2, that terminal detects from the SIG 1 field that the data frame addressed to the terminal itself is transmitted using the channel 2 and receives the data frame. The terminals 21 to 23 and 27 to 29 belonging to the AP 2 stand by, for example, at the channels 1 to 4, and then, decodes and analyzes the TF 12 received using the channel 3 or 4 so as to detect the RUs allocated to the terminals themselves to perform UL-OFDMA transmission (see FIG. 19B). If a data frame addressed to any terminal is transmitted using the channel 4, that terminal detects from the SIG 1 field that the data frame addressed to the terminal itself is transmitted using the channel 4 and also receives the data frame.

As described above, according to the present embodiment, the AP 1 and the AP 2 can use the same channel to perform UL-OFDMA with the high frequency usage efficiency. In other words, the AP 1 and the AP 2 transmit the trigger frame having the same content (more specifically, the physical packet having the same content), or the trigger frame using the different channel to allow the terminal in the overlap area also to correctly receive the trigger frame transmitted from the AP to which the terminal itself belong. Therefore, also in the case of UL-OFDMA, the FFR for using the same RU by a plurality of APs at the same time can be achieved with the high frequency usage efficiency.

Third Embodiment

In the first embodiment, the AP 1 and the AP 2 allocate the identical RU (RU for FFR), of a plurality of RUs used for DL-OFDMA, to the terminals having the same STAID to achieve the high efficient FFR. In the third embodiment, the AP 1 and the AP 2 use the identical RU (RU for FFR), of a plurality of RUs used for DL-OFDMA, to perform the downlink multiuser MIMO (Multi-Input and Multi-Output) (DL-MU-MIMO) to achieve the high efficient FFR. In other words, of a plurality of RUs used for DL-OFDMA, a part of the RUs (RU for FFR) is used to perform the DL-MU-MIMO. This scheme is designated as DL-OFDMA & MU-MIMO.

Figure 21:
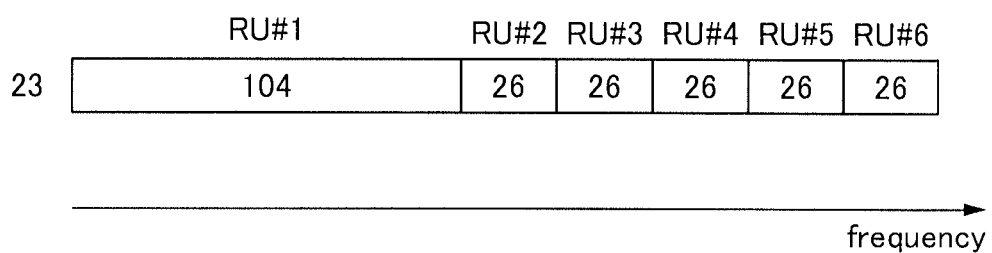
FIG. 21 is a diagram showing an exemplary allocation pattern of the RU to a frequency domain.

In order to perform the DL-MU-MIMO via the RU, an RU greater than or equal to 106 tones needs to be used, as an example. For this reason, as the RU allocation pattern, the allocation patterns No. 16 to No. 23 in FIG. 3 can be used, for example. Hereinafter, the allocation pattern No. 23 is assumed. FIG. 21 shows the allocation pattern No. 23. As shown in the figure, a 106-tone RU is designated as the RU #1 (or RU for FFR), and five 26-tone RUs are designated as the RU #2, the RU #3, the RU #4, the RU #5, and the RU #6 in ascending order of the frequency.

Assume a case where the AP 1 performs the DL-MU-MIMO transmission to the terminal 11 and the terminal 12 via the RU #1 (the DL-MU-MIMO transmission with the number of multiplexes is two), to the terminal 14 via the RU #2, and to the terminal 15 via the RU #3. The transmissions to the terminal 14 and the terminal 15 may be performed by way of the beam forming or non-directional transmission (omnidirectional transmission). In addition, assume a case where the AP 2 performs the DL-MU-MIMO transmission to the terminal 21 via the RU #1 (the DL-MU-MIMO transmission with the number of multiplexes is one), to the terminal 23 via the RU #4, to the terminal 27 via the RU #5, and to the terminal 28 via the RU #6. The transmissions to the terminal 23, the terminal 27, and the terminal 28 may be performed by way of the beam forming or the non-directional transmission (omnidirectional transmission). Here, terminals as targets for the DL-MU-MIMO transmission are the terminals in the neighbor areas A1 and B1, without limitation.

Figures 22A, 22B:
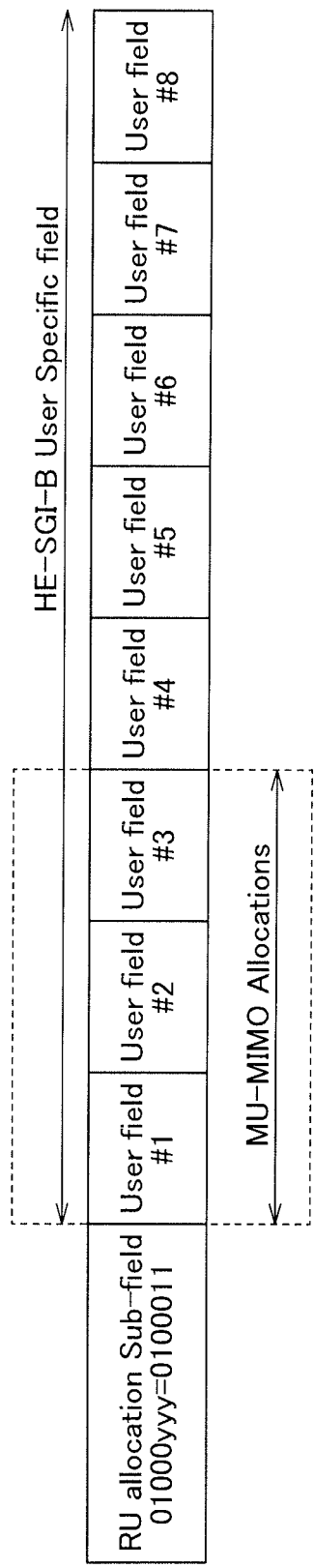
FIG. 22A and FIG. 22B are each a diagram showing an exemplary setting in a field in a case of DL-MU-MIMO via a particular RU.

Here, in the case of the pattern No. 23, a value set in the RU allocation Sub-field in FIG. 7 may be "01000$y_2 y_1 y_0$". A value of "$y_2 y_1 y_0$" may take a value in a range from "000" to "111". The value of "$y_2 y_1 y_0$" is set to a value corresponding to the number of multiplexes of the transmission via the 106-tone RU (RU #1). In the example, via the RU #1, the AP 1 performs double multiplexing transmission and the AP 2 performs single multiplexing transmission, and accordingly, a value representing the number of multiplexes of 3, that is "011", is set to "$y_2 y_1 y_0$". In other words, the RU allocation Sub-field is set to "01000011". An exemplary setting is shown in FIG. 22A. Both the AP 1 and the AP 2 set this value.

The User Specific field subsequent to the RU allocation Sub-field contains the User field #1 to the User field #3 corresponding to the number of multiplexes of 3, and the User field #4 to the User field #8 respectively corresponding to the 26-tone RU #2 to RU #6. In other words, as shown in FIG. 22B, three User fields are used with respect to the 106-tone RU, and one User field is used with respect to each of the 26-tone RU #2 to RU #6. By changing the value of "$y_2 y_1 y_0$", the number of the User fields (the number of multiplexes) with respect to the 106-tone RU changes. Such a rule is recognized in common to the APs and the terminals.

As for the terminals 11 and 12 as the targets for the DL-MU-MIMO transmission, the AP 1 sets the terminal allocation information of the terminal 11 in the predetermined User field #1 of the plural User fields #1 to #3, and the terminal allocation information of the terminal 12 in the predetermined User field #2 of the plural User fields #1 to #3. The terminal allocation information includes the STAID, information identifying a stream, the number of the streams, the MCS, and the like, for example. The AP 1 sets the terminal allocation information of the terminal 14 in the User field #4, and the terminal allocation information of the terminal 15 in the User field #5. The terminal allocation information of the terminals 14 and 15 may include the STAID, the number of the streams, whether to receive the beam forming, the MCS, and the like, for example.

As for the terminals 21 as the target for the DL-MU-MIMO transmission, the AP 2 sets the terminal allocation information of the terminal 21 in the predetermined User field #3 of the plural User fields #1 to #3. Moreover, the AP 2 sets the terminal allocation information of the terminal 23, the terminal 27, and the terminal 28 respectively in the User field #6 to the User field #8.

Further, the AP 2 cooperates with the AP 1 to acquire the information of the RUs (RU #1, RU #2, RU #4, and RU #5) allocated by the AP 1 to the terminal 11, the terminal 12, the terminal 14, and the terminal 15, and the terminal allocation information of these terminals. Then, the AP 2 sets the terminal allocation information of the terminals 11 and 12 acquired from the AP 1 respectively in the User fields #1 and #2, of the User fields #1 to #3 corresponding to the RU #1, and also sets the terminal allocation information of the terminals 14 and 15 acquired from the AP 1 respectively in the User fields #4 and #5 corresponding to the RU #4 and the RU #5.

The AP 1 also acquires the information of the RUs (RU #1, RU #4, RU #5, and RU #6) allocated by the AP 2 to the terminal 21, the terminal 23, the terminal 27, and the terminal 28, and the terminal allocation information of these terminals. Then, the AP 1 sets the terminal allocation information of the terminals 21 acquired from the AP 2 in the User field #3, of the User fields #1 to #3 corresponding to the RU #1, and also sets the terminal allocation information of the terminals 23, 27 and 28 acquired from the AP 2 respectively in the User fields #6, #7, and #8 corresponding to the RU #4, #5, and the RU #6.

In accordance with the above operation, the User fields #1 to #8 set by the AP 1 and the User fields #1 to #8 set by the AP 2 become identical. As described above, the RU allocation Sub-fields are set to the value the same between the AP 1 and the AP 2.

Figure 23:
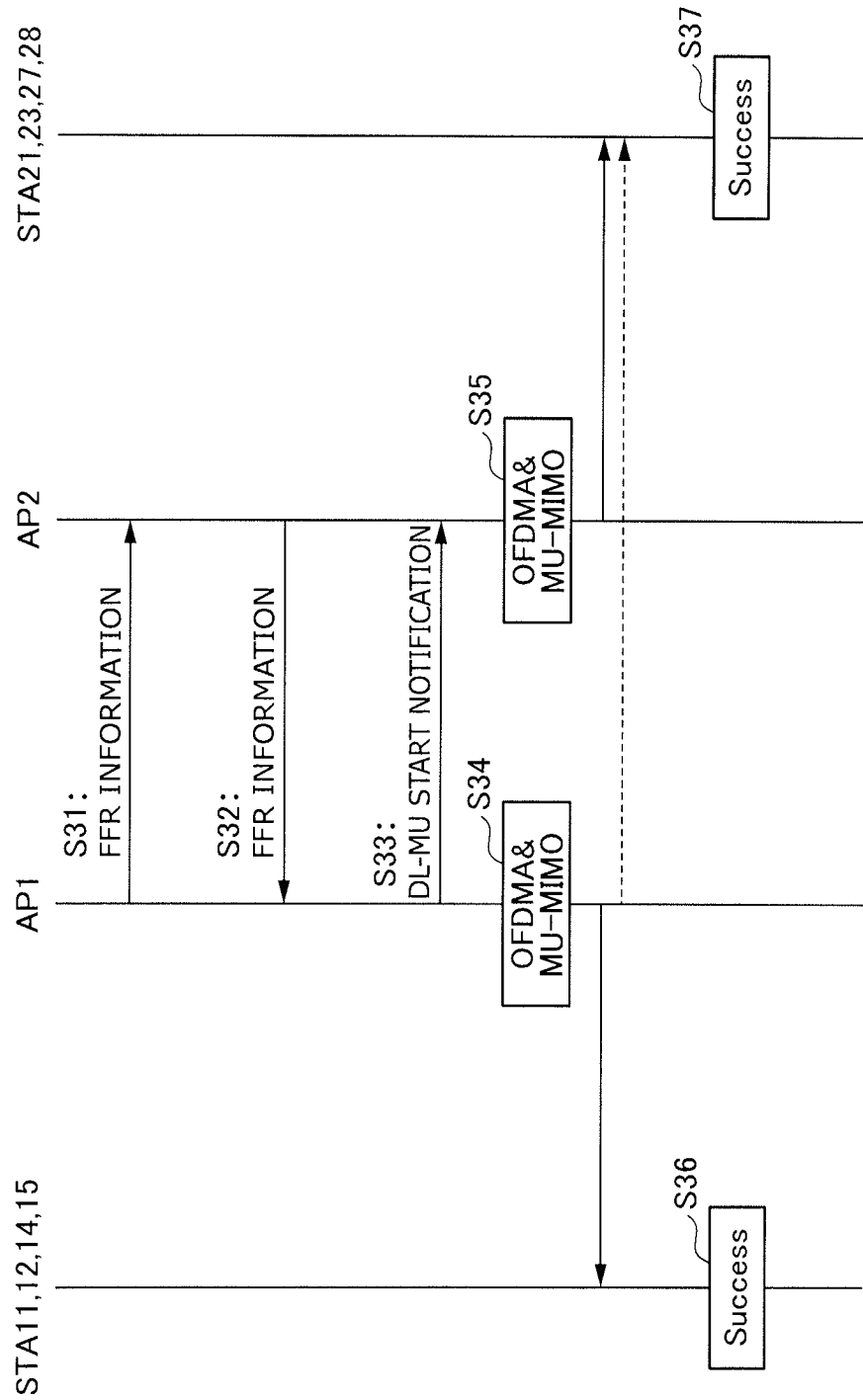
FIG. 23 is a diagram showing an operation sequence of a wireless LAN system according to a third embodiment.

FIG. 23 shows an operation sequence of a wireless LAN system according to the present embodiment. Once the AP 1 determines to perform DL-OFDMA & MU-MIMO transmission in cooperation with the AP 2, it transmits data including information (FFR information) required for the cooperation to the AP 2 (S31).

More specifically, the AP 1 determines the RU allocation pattern having a RU having the number of tones capable of the MU-MIMO, and determines the relevant RU having the number of tones as the RU for FFR. The AP 1 also determines the maximum number of multiplexes for the DL-MU-MIMO performed using the RU for FFR. The maximum number of multiplexes may be that obtained by multiplying the number of multiplexes the AP 1 desires by a certain value, or that obtained by adding the number of multiplexes the AP 2 desires which is notified in advance from the AP 2 to the number of multiplexes the AP 1 desires. The AP 1 determines a value to be set in the RU allocation Sub-field (hereinafter, referred to as a pattern setting value) from the determined RU allocation pattern and the maximum number of multiplexes.

Here, similar to the above example, the AP 1 selects the RU allocation pattern No. 23 to determine the RU #1 in FIG. 21 as the RU for FFR. The maximum number of multiplexes is determined to be "3", and the pattern setting value is set to "01000011". The terminals 11 and 12 are selected as the terminals to perform the DL-MU-MIMO. The terminals 14 and 15 are selected as the terminals to be allocated with the RU #2 and the RU #3 which are the RUs (usual RUs) other than the RU for FFR.

On the basis of the above determination, the AP 1 generates the FFR information and transmits the generated FFR information to the AP 2. Concretely, the AP 1 transmits the pattern setting value (the RU allocation pattern and the maximum number of multiplexes) and the information (FFR-on information) specifying the RU for FFR (RU #1). Further, the terminal allocation information of the terminals 11 and 12 which use the RU #1 and the terminal allocation information of the terminals 14 and 15 to which the RU #2 and the RU #3 are allocated. Information may be further transmitted which indicates that the terminal 11 corresponds to the User field #1 and the terminal 12 corresponds to the User field #2. The details of the terminal allocation information are as described above.

The AP 2 grasps the RU allocation pattern to be used this time on the basis of the FFR information received from the AP 1, and grasps that the RU #1 is the RU for FFR and the maximum number of multiplexes is "3". The AP 2 determines that the RU #2 and the RU #3 are used by the AP 1, and thus, the AP 2 itself can use the RU #4 to the RU #6. The AP 2 determines that, on the basis that the AP 1 already allocates the RU #1 to two terminals, the AP 2 itself can allocate the RU #1 to only one terminal. Then, assume that the AP 2 determines to allocate the RU #1 to the terminal 21. Alternatively, assume that the AP 2 determines to allocate the RU #4 to RU #6 to the terminal 23, the terminal 27, and the terminal 29. The AP 2 transmits as the FFR information, to the AP 1, the terminal allocation information of the terminal 21 allocated with the RU #1, and the terminal allocation information of the terminals 23, 27, and 28 allocated with the RU #4 to the RU #6 (S32).

Once the AP 1 receives the FFR information from the AP 2, it determines an execution timing for DL-OFDMA & MU-MIMO and transmits the DL-MU start notification frame specifying the execution timing to the AP 2 (S33).

When the execution timing for DL-OFDMA & MU-MIMO arrives, the AP 1 and the AP 2 perform DL-OFDMA & MU-MIMO transmission (S34, S35). This allows the AP 1 and the AP 2 to simultaneously perform DL-OFDMA & MU-MIMO transmission.

Figure 24A:
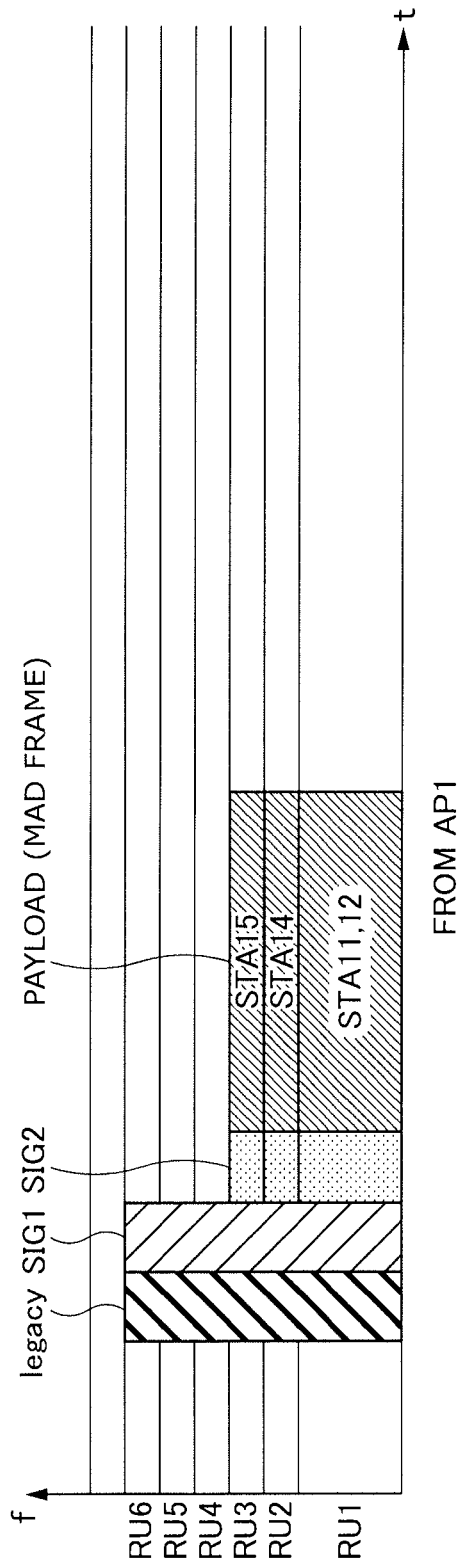
FIG. 24A and FIG. 24B are each a diagram showing an exemplary physical packet transmitted by way of DL-OFDMA & MU-MIMO.
Figure 24B:
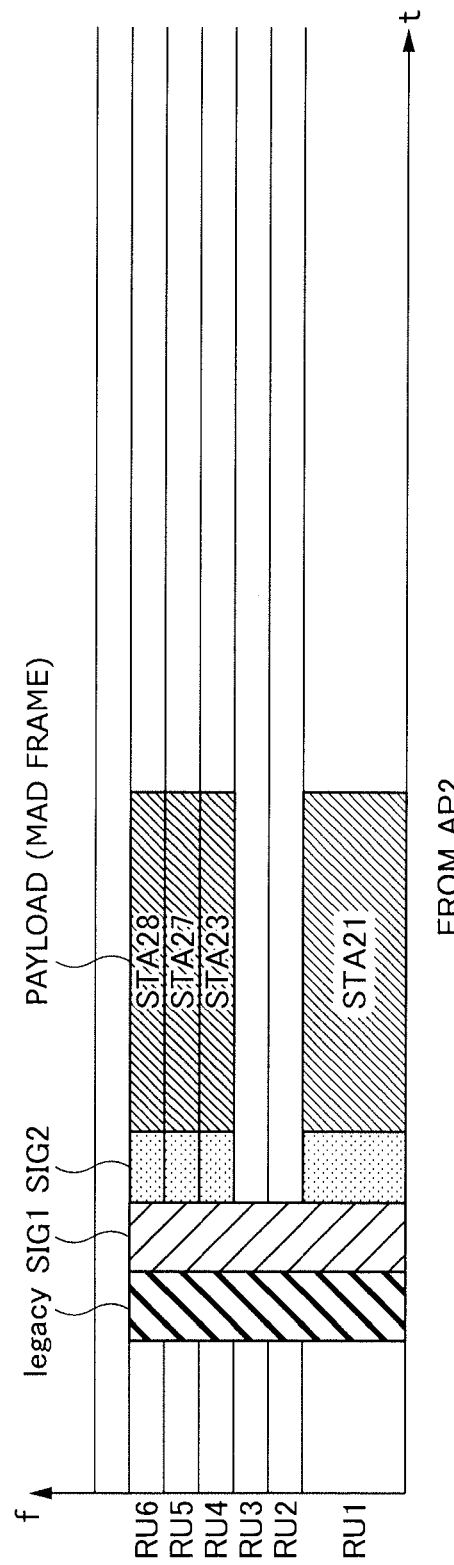

FIG. 24A and FIG. 24B respectively show exemplary physical packets the AP 1 and the AP 2 transmit. The legacy field and the SIG 1 field (containing the RU allocation Sub-field and the User Specific field) in the physical packet transmitted by the AP 1 are the same as those in the physical packet transmitted by the AP 2. The legacy field and the SIG 1 field are transmitted at the channel width band. Via the RU #1, the SIG 2 field and the MAC frame are transmitted by spatial multiplexing (double multiplexing) from the AP 1 to the terminal 11 and the terminal 12, and the SIG 2 field and the MAC frame are transmitted by spatial multiplexing (single multiplexing) from the AP 2 to the terminal 21.

Here, the terminals 11 and 12 hold in advance space separation information (bit patterns) orthogonal to each other. The SIG 2 field transmitted by the AP 1 via the R1 #1 is multiplexed by signals (preamble signals) having these bit patterns orthogonal to each other. This allows each of the terminals 11 and 12 to extract signals by subjecting the signal of the SIG 2 field to an arithmetic on the basis of the space separation information of the terminal itself. The extracted signal is a signal whose amplifier and phase are varied owing to the channel. Each of the terminals 11 and 12 calculates a channel response on the basis of this signal and the signal represented by the space separation information to separate a stream addressed to the terminal itself subsequent to the SIG 2 field using the channel response. This allows the MAC frame to be acquired. The separating method of the stream is not limited to this, and any other method may be adapted. Examples of the above space separation information may include rows and columns in an orthogonal matrix. The space separation information may be, besides being held by the terminal in advance, set in the User field for each terminal or the like in the SIG 1 field as a method. The SIG 2 field transmitted by the AP 2 via the RU #2 also includes the bit pattern the same as that of the space separation information held by the terminal 21, similarly.

The terminals 14 and 15 specified in the physical packet transmitted by the AP 1, similarly to the first embodiment, respectively interpret the SIG 1 field, identify the RU #2 and the RU #3 allocated to the terminals themselves, and decode the signals of the identified RUs to receive the MAC frames (S36). The SIG 2 field transmitted via the RU #2 and the RU #3 may be a training field or other field, for example. Each of the terminals 11 and 12 separates a stream addressed to the terminal itself from the signal transmitted via the RU #1 using the above method to receive the MAC frame.

On the other hand, the terminals 23, 27 and 28 specified in the physical packet transmitted by the AP 2, similarly to the first embodiment, respectively interpret the SIG 1 field, identify the RU #4, the RU #5 and the RU #6 allocated to the terminals themselves, and decode the signals of the identified RUs to receive the MAC frames (S37). The SIG 2 field transmitted via the RU #4, the RU #5 and the RU #6 may be a training field or other field, for example. Terminal 21 separates a stream addressed to the terminal itself from the signal transmitted via the RU #1 using the above method to receive the MAC frame (S37 also). The terminal 27 and the terminal 28 simultaneously receive the signals of the physical packets from both the AP 1 and the AP 2, but since the legacy fields and the SIG 1 fields of them are the same, the received signals can be correctly decoded to identify the RUs allocated to the terminals themselves.

The RU allocation pattern No. 23 used in the above example includes only one RU greater than or equal to 106 tones, but the RU allocation pattern including two or more relevant RUs may be used. In this case, each of two or more RUs can perform the DL-MU-MIMO. For example, in a case where the RU allocation pattern No. 24 in FIG. 3 is used, there are two 106-tone RUs (RUs for FFR). For this reason, each of two RUs for FFR can perform the DL-MU-MIMO. In this case, the pattern setting value simultaneously representing the RU allocation pattern, the number of multiplexes in the transmission via the RU for FFR on the left side (low frequency side), and the number of multiplexes in the transmission via the RU for FFR on the right side (high frequency side) may be set in the RU Allocation Sub-field.

For example, in the case of the RU allocation pattern No. 24, the pattern setting value may be represented by a form of "$01y_2y_1y_0z_2z_1z_0$". A value of "$y_2y_1y_0$" is a value in a range from "000" to "111", and a value of "$z_2z_1z_0$" is a value in a range from "000" to "111". The value of "$y_2y_1y_0$" is set to a value corresponding to the maximum number of multiplexes in the transmission performed via the RU for FFR on the left side, and the value of "$z_2z_1z_0$" is set to a value corresponding to the maximum number of multiplexes in the transmission performed via the RU for FFR on the right side. For example, if the maximum number of multiplexes for the RU on the left side is set to "3", the value of "$y_2y_1y_0$" is set to "011", and if the maximum number of multiplexes for the RU on the right side is set to "4", the value of "$z_2z_1z_0$" is set to "100".

As described above, according to the present embodiment, the AP 1 and the AP 2 use the identical RU (RU for FFR), of a plurality of RUs used for DL-OFDMA, to perform the DL-MU-MIMO, and the contents of the physical header parts (SIG 1 fields or the like) are identical between the AP 1 and the AP 2. By doing so, the terminal receiving the signals from both the AP 1 and the AP 2 can also decode the header part, and thus, can correctly receive the frame transmitted from the AP to which the terminal itself belongs. Therefore, a FFR having high frequency efficiency can be achieved in a wireless LAN system.

Fourth Embodiment

Figure 25:
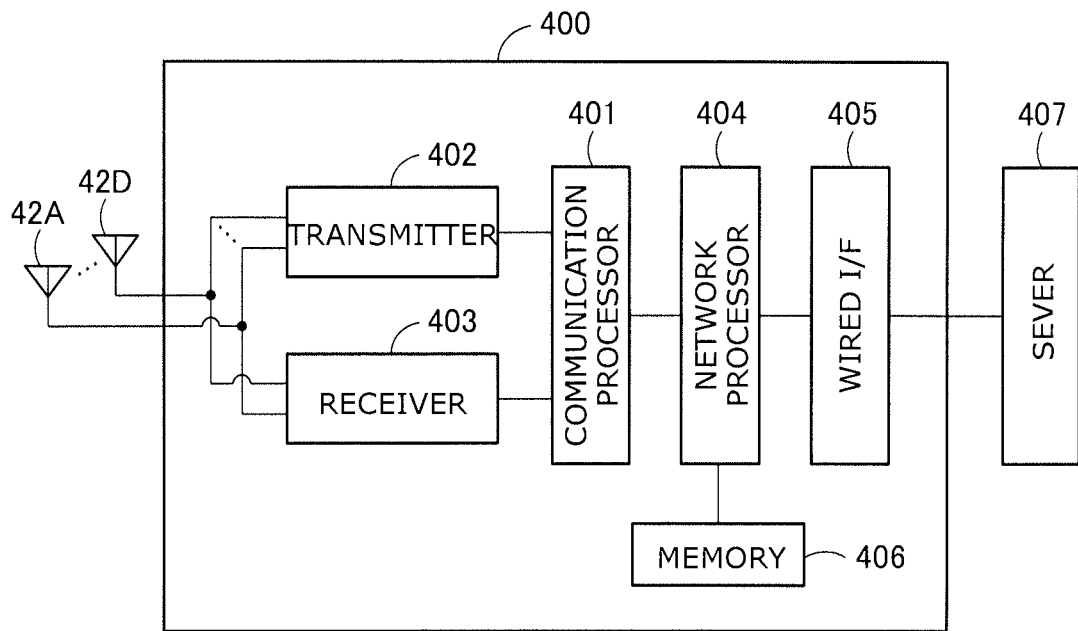
FIG. 25 is a functional block diagram of an access point or terminal.

FIG. 25 is a functional block diagram of a base station (access point) 400 according to the embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The communication processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 25. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Fifth Embodiment

Figure 26:
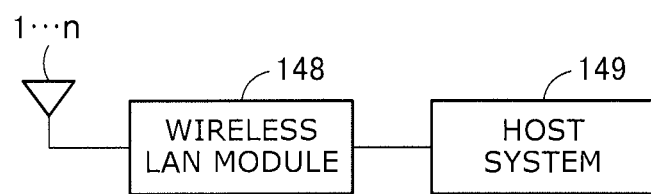
FIG. 26 is a diagram showing an exemplary overall configuration of a terminal or access point.

FIG. 26 shows an example of entire configuration of a terminal (non-AP terminal) or a base station (AP). The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to any of the embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 27:
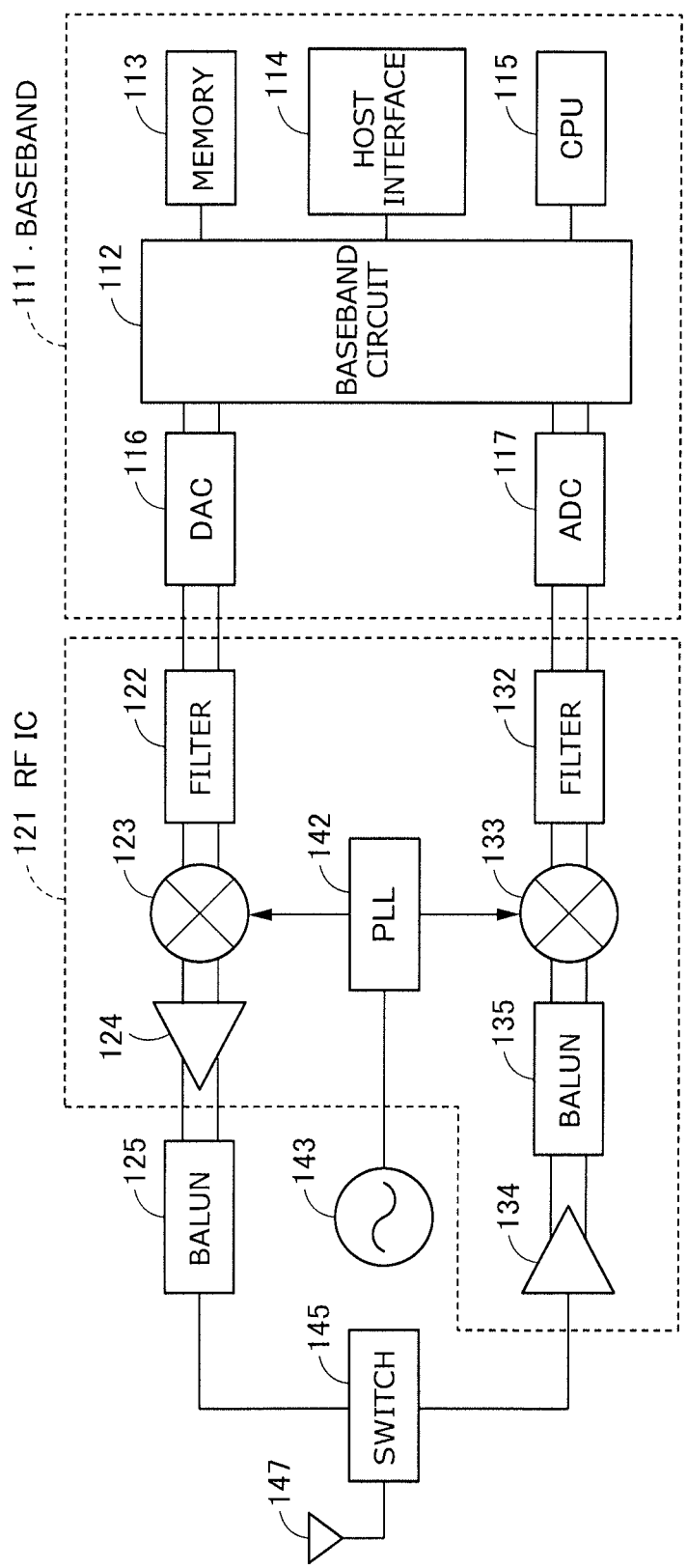
FIG. 27 is a diagram showing an exemplary hardware configuration of a wireless communication device equipped in an access point or terminal.

FIG. 27 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples of the wireless communication device in any embodiment as described so far. In the configuration shown in figure, at least one antenna is included although a plurality of antennas are included. In this case, a plurality of sets of a transmission system (116 and 122 to 125), a reception system (117, 132 to 135), a PLL 142, a crystal oscillator (reference signal source) 143, and a switch 145 may be arranged according to the antennas, and each set may be connected to a control circuit 112. One or both of the PLL 142 and the crystal oscillator 143 correspond to an oscillator according to the present embodiment.

The wireless LAN module (wireless communication device) includes a baseband IC (Integrated Circuit) 111, an RF (Radio Frequency) IC 121, a balun 125, the switch 145, and the antenna 147.

The baseband IC 111 includes the baseband circuit (control circuit) 112, a memory 113, a host interface 114, a CPU 115, a DAC (Digital to Analog Converter) 116, and an ADC (Analog to Digital Converter) 117.

The baseband IC 111 and the RF IC 121 may be formed on the same substrate. The baseband IC 111 and the RF IC 121 may be formed by one chip. Both or one of the DAC 116 and the ADC 117 may be arranged on the RF IC 121 or may be arranged on another IC. Both or one of the memory 113 and the CPU 115 may be arranged on an IC other than the baseband IC.

The memory 113 stores data to be transferred to and from the host system. The memory 113 also stores one or both of information to be transmitted to the terminal or the base station and information transmitted from the terminal or the base station. The memory 113 may also store a program necessary for the execution of the CPU 115 and may be used as a work area for the CPU 115 to execute the program. The memory 113 may be a volatile memory, such as an SRAM or a DRAM, or may be a non-volatile memory, such as a NAND or an MRAM.

The host interface 114 is an interface for connection to the host system. The interface can be anything, such as UART, SPI, SDIO, USB, or PCI Express.

The CPU 115 is a processor that executes a program to control the baseband circuit 112. The baseband circuit 112 mainly executes a process of the MAC layer and a process of the physical layer. One or both of the baseband circuit 112 and the CPU 115 correspond to the communication control apparatus that controls communication, the controller that controls communication, or controlling circuitry that controls communication.

At least one of the baseband circuit 112 or the CPU 115 may include a clock generator that generates a clock and may manage internal time by the clock generated by the clock generator.

For the process of the physical layer, the baseband circuit 112 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 116 performs DA conversion of signals input from the baseband circuit 112. More specifically, the DAC 116 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 121 is, for example, one or both of an RF analog IC and a high frequency IC. The RF IC 121 includes a filter 122, a mixer 123, a preamplifier (PA) 124, the PLL (Phase Locked Loop) 142, a low noise amplifier (LNA) 134, a balun 135, a mixer 133, and a filter 132. Some of the elements may be arranged on the baseband IC 111 or another IC. The filters 122 and 132 may be bandpass filters or low pass filters.

The filter 122 extracts a signal of a desired band from each of the analog I signal and the analog Q signal input from the DAC 116. The PLL 142 uses an oscillation signal input from the crystal oscillator 143 and performs one or both of division and multiplication of the oscillation signal to thereby generate a signal at a certain frequency synchronized with the phase of the input signal. Note that the PLL 142 includes a VCO (Voltage Controlled Oscillator) and uses the VCO to perform feedback control based on the oscillation signal input from the crystal oscillator 143 to thereby obtain the signal at the certain frequency. The generated signal at the certain frequency is input to the mixer 123 and the mixer 133. The PLL 142 is equivalent to an example of an oscillator that generates a signal at a certain frequency.

The mixer 123 uses the signal at the certain frequency supplied from the PLL 142 to up-convert the analog I signal and the analog Q signal passed through the filter 122 into a radio frequency. The preamplifier (PA) amplifies the analog I signal and the analog Q signal at the radio frequency generated by the mixer 123, up to desired output power. The balun 125 is a converter for converting a balanced signal (differential signal) to an unbalanced signal (single-ended signal). Although the balanced signal is handled by the RF IC 121, the unbalanced signal is handled from the output of the RF IC 121 to the antenna 147. Therefore, the balun 125 performs the signal conversions.

The switch 145 is connected to the balun 125 on the transmission side during the transmission and is connected to the LNA 134 or the RF IC 121 on the reception side during the reception. The baseband IC 111 or the RF IC 121 may control the switch 145. There may be another circuit that controls the switch 145, and the circuit may control the switch 145.

The analog I signal and the analog Q signal at the radio frequency amplified by the preamplifier 124 are subjected to balanced-unbalanced conversion by the balun 125 and are then emitted as radio waves to the space from the antenna 147.

The antenna 147 may be a chip antenna, may be an antenna formed by wiring on a printed circuit board, or may be an antenna formed by using a linear conductive element.

The LNA 134 in the RF IC 121 amplifies a signal received from the antenna 147 through the switch 145 up to a level that allows demodulation, while maintaining the noise low. The balun 135 performs unbalanced-balanced conversion of the signal amplified by the low noise amplifier (LNA) 134. The mixer 133 uses the signal at the certain frequency input from the PLL 142 to down-convert, to a baseband, the reception signal converted to a balanced signal by the balun 135. More specifically, the mixer 133 includes a unit that generates carrier waves shifted by a phase of 90 degrees based on the signal at the certain frequency input from the PLL 142. The mixer 133 uses the carrier waves shifted by a phase of 90 degrees to perform quadrature demodulation of the reception signal converted by the balun 135 and generates an I (In-phase) signal with the same phase as the reception signal and a Q (Quad-phase) signal with the phase delayed by 90 degrees.

The filter 132 extracts signals with desired frequency components from the I signal and the Q signal. Gains of the I signal and the Q signal extracted by the filter 132 are adjusted, and the I signal and the Q signal are output from the RF IC 121. The ADC 117 in the baseband IC 111 performs AD conversion of the input signal from the RF IC 121. More specifically, the ADC 117 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 112 executes a process of the physical layer and the like, such as demodulation process, error correcting code process, and process of physical header, and obtains a frame. The baseband circuit 112 applies a process of the MAC layer to the frame. Note that the baseband circuit 112 may be configured to execute a process of TCP/IP when the TCP/IP is implemented.

Sixth Embodiment

Figure 28:
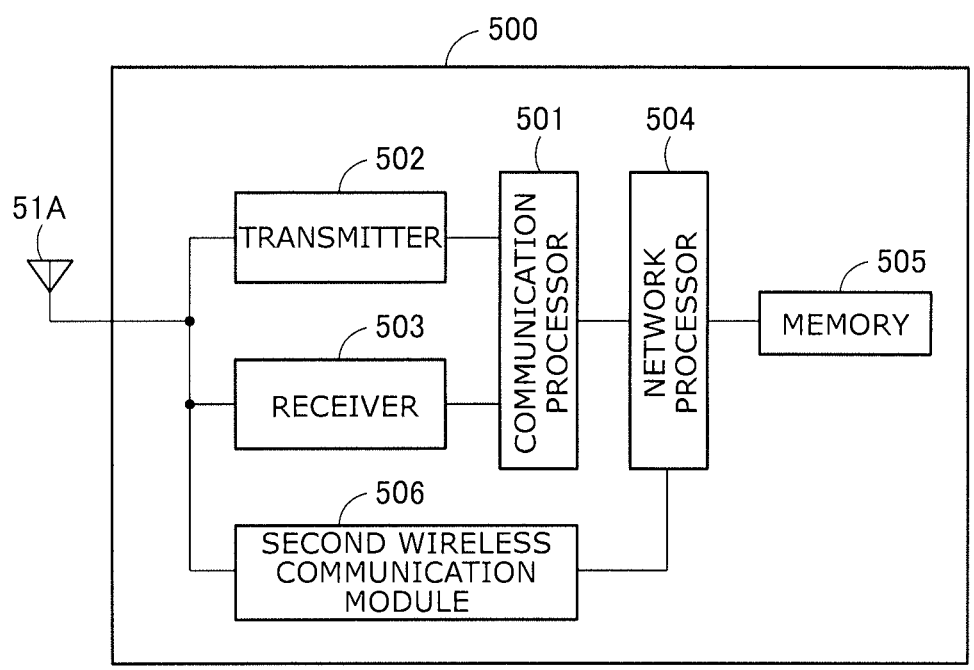
FIG. 28 is a functional block diagram of a terminal or access point.

FIG. 28 is a functional block diagram of the terminal (STA) 500 according to a sixth embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to MAC/PHY manager as described in the first embodiment. The transmitter 502 and the receiver 503 have the functions similar to PHY processor and MAC processor as described in the first embodiment. The transmitter 502 and the receiver 503 may perform analog domain processing in PHY processor and the communication processor 501 may perform digital domain processing in MAC processor and digital domain processing in PHY processor. The communication processor 501 may internally possess a buffer for transferring data to and from the application processor 504.

The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 has the similar configuration to the WLAN module as shown in FIG. 26 or FIG. 27 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

Seventh Embodiment

Figure 29A:
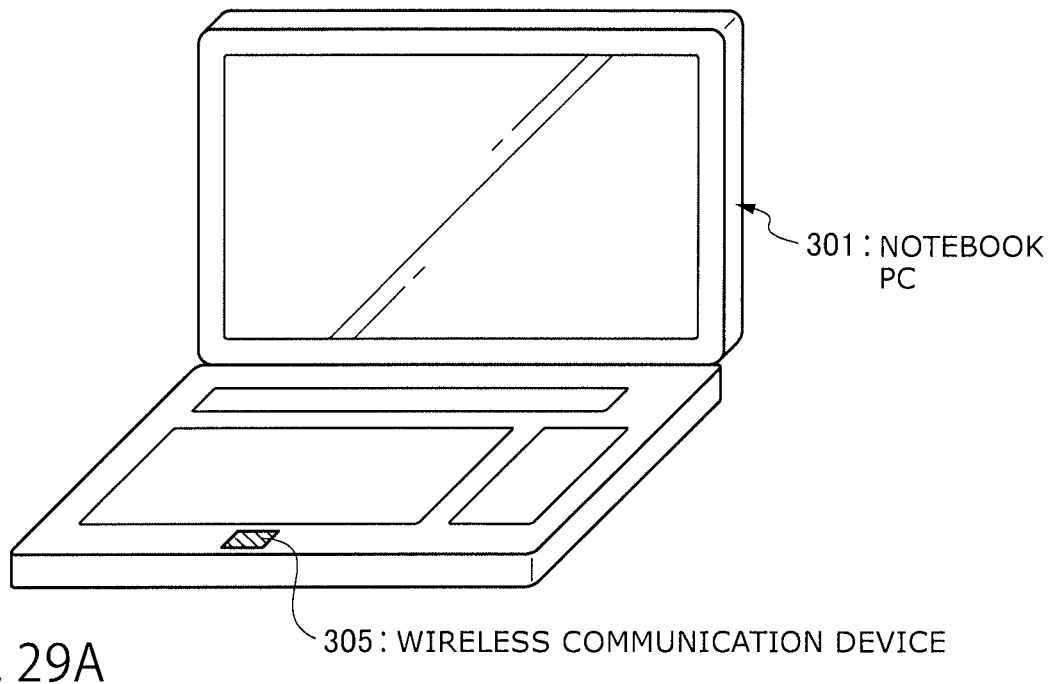
FIG. 29A and FIG. 29B are each a perspective view of a terminal according to an embodiment of the invention.
Figure 29B:
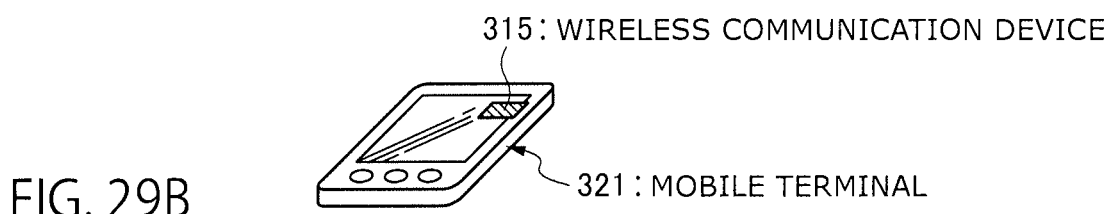

FIG. 29A and FIG. 29B are perspective views of wireless terminal according to the present embodiment. The wireless terminal in FIG. 29A is a notebook PC 301 and the wireless communication device (or a wireless device) in FIG. 29B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 30:
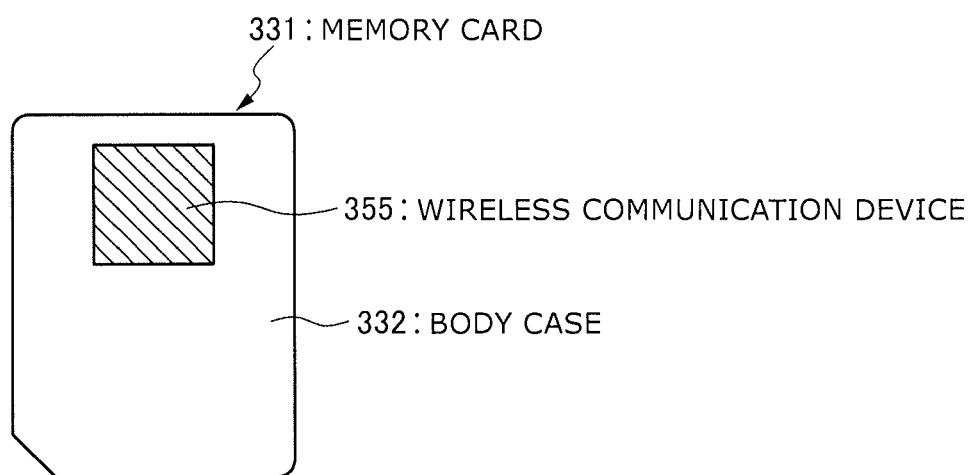
FIG. 30 is a diagram showing a memory card according to an embodiment of the invention.

Moreover, a wireless communication device installed in a terminal (which may indicate a base station) can also be provided in a memory card. FIG. 30 illustrates an example of a wireless communication device mounted on a memory card. A memory card 331 contains a wireless communication device 355 and a body case 332. The memory card 331 uses the wireless communication device 355 for wireless communication with external devices. Here, in FIG. 30, the description of other installed elements (for example, a memory, and so on) in the memory card 331 is omitted.

Eighth Embodiment

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Ninth Embodiment

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Tenth Embodiment

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eleventh Embodiment

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Twelfth Embodiment

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Thirteenth Embodiment

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Fourteenth Embodiment

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Fifteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Sixteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 31:
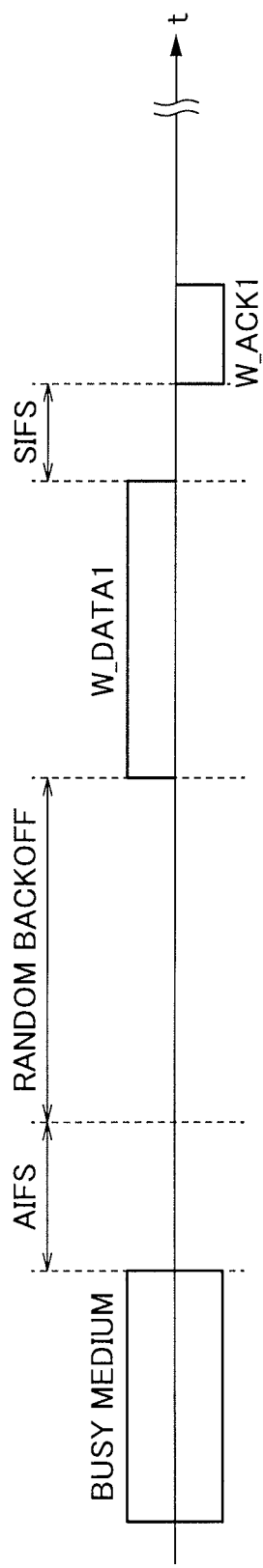
FIG. 31 is a diagram showing an example of frame exchange during a contention period.

Here, FIG. 31 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory.

The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device communicating with a second wireless communication device, comprising:
a receiver configured to
receive a terminal identifier of a first terminal being a target for downlink frequency multiplexing transmission from the second wireless communication device, the first terminal existing at a neighbor area of the second wireless communication device and the terminal identifier of the first terminal being allocated by the second wireless communication device, and
receive information identifying, among a plurality of frequency components, a first frequency component allocated to the first terminal;
a controller configured to
select, among a plurality of second terminals belonging to the wireless communication device, a second terminal existing at a neighbor area of the wireless communication device, a terminal identifier of the second terminal being allocated by the wireless communication device and being same as the terminal identifier of the first terminal, and
allocate the first frequency component to the selected second terminal; and
a transmitter configured to transmit a first physical packet in a period at least partially overlapping with a period in which a second physical packet is transmitted from the second wireless communication device, the first physical packet including
(1) a first header containing a plurality of first fields associated with the plurality of frequency components, the terminal identifier of the selected second terminal being set in a field corresponding to the first frequency component among the plurality of first fields, and
(2) a first frame addressed to the second terminal,
wherein the first header is transmitted at a frequency band including the plurality of frequency components and the first frame is transmitted via the first frequency component, the transmitter being configured to transmit the terminal identifier of the second terminal and the information identifying the first frequency component to the second wireless communication device, wherein the second physical packet including
(1) a second header containing a plurality of second fields associated with the plurality of frequency components, the terminal identifier of the first terminal being set in a field corresponding to the first frequency component among the plurality of second fields, and
(2) a second frame addressed to the first terminal, the second header being transmitted at the frequency band including the plurality of frequency components and the second frame is transmitted via the first frequency component, and
a format of the first header being the same as a format of the second header.

2. The wireless communication device according to claim 1, wherein
the receiver is configured to receive timing information of transmission of the second physical packet from the second wireless communication device, and
the transmitter is configured to transmit the first physical packet in accordance with the timing information.

3. The wireless communication device according to claim 1, wherein
the receiver is configured to receive a terminal identifier of another first terminal being a target for the downlink frequency multiplexing transmission from the second wireless communication device, the terminal identifier of the another first terminal being allocated by the second wireless communication device,
the another first terminal existing in a distant area of the second wireless communication device and receiving information identifying a second frequency component allocated to the another first terminal,
the controller is configured to allocate the second frequency component to none of a plurality of second terminals, and
the transmitter is configured to set the terminal identifier of the another first terminal in a field corresponding to the second frequency component among the plurality of first fields, in the first header,
the terminal identifier of the another first terminal being set in a field corresponding to the second frequency component among the plurality of second fields, in the second header of the second physical packet.

4. The wireless communication system according to claim 3, wherein
the controller is configured to select, among the plurality of second terminals, another second terminal other than the second terminal allocated with the first frequency component, the another second terminal existing in a distant area of the wireless communication device and is configured to allocate a third frequency component to the other second terminal, and
the transmitter is configured to set a terminal identifier of the other second terminal in a field corresponding to the third frequency component among the plurality of first fields in the first header, the terminal identifier of the another second terminal being allocated by the wireless communication device, and
the transmitter is configured to transmit the terminal identifier of the another second terminal and information to specify the third frequency component to the second wireless communication device, the terminal identifier of the another second terminal being set in a field corresponding to the third frequency component among the plurality of second fields, in the second header of the second physical packet.

5. The wireless communication system according to claim 1, comprising at least one antenna.

6. A wireless communication device communicating with a second wireless communication device, comprising:
a receiver configured to
receive a terminal identifier of a first terminal being a target for downlink frequency multiplexing transmission from second wireless communication device, and
receive information identifying, among a plurality of frequency components, a first frequency component allocated to the first terminal, the first terminal existing at a neighbor area of the second wireless communication device and the terminal identifier of the first terminal being allocated by the second wireless communication device;
a controller configured to select, among a plurality second terminals belonging to the wireless communication device, at least one second terminal allocated with the first frequency component, the at least one second terminal existing at a neighbor area of the wireless communication device and the terminal identifier of the at least one second terminal being allocated by the wireless communication device; and
a transmitter configured to transmit a first physical packet in a period at least partially overlapping with a period in which a second physical packet is transmitted from the second wireless communication device, the first physical packet including
(1) a first header containing at least a plurality of first fields associated with the first frequency component, the terminal identifier of the first terminal being set in a field of the plurality of first fields associated with the first frequency component, a terminal identifier of the at least one selected second terminal being set in at least one field of the plurality of first fields associated with the first frequency component, and
(2) at least one first frame addressed to the at least one second terminal,
wherein the first header is transmitted at a frequency band including the plurality of frequency components and
the at least one first frame is transmitted via the first frequency component in a spatial multiplexing manner,
the transmitter is configured to transmit the terminal identifier of the at least one second terminal and the information identifying the first frequency component to the second wireless communication device,
the second physical packet includes
(1) a second header containing a plurality of second fields associated with the first frequency component, the terminal identifier of the first terminal being set in a field of the plurality of second fields associated with the first frequency component and the terminal identifier of the at least one selected second terminal being set in at least one field of the plurality of second fields associated with the first frequency component, and (2) a second frame addressed to the first terminal, wherein the second header is transmitted at the frequency band including the plurality of frequency components, the first frame is transmitted via the first frequency component in a spatial multiplexing manner, and a format of the first header is the same as a format of the second header.

7. The wireless communication device according to claim 6, wherein the receiver is configured to receive timing information of transmission of the second physical packet from the second wireless communication device, and the transmitter is configured to transmit the second physical packet in accordance with the timing information.

8. The wireless communication device according to claim 6, wherein the receiver is configured to receive a terminal identifier of another first terminal being a target for the downlink frequency multiplexing transmission from the second wireless communication device, and information identifying a second frequency component allocated to the another first terminal, the terminal identifier of the another first terminal being allocated by the second wireless communication device, the another first terminal existing in a distant area of the second wireless communication device and the transmitter is configured to set the terminal identifier of the another first terminal in a field corresponding to the second frequency component, in the first header, the terminal identifier of the another first terminal being set in a field corresponding to the second frequency component, in the second header of the second physical packet, the second physical packet including a fourth frame addressed to the another first terminal, and the fourth frame being transmitted via the second frequency component.

9. The wireless communication system according to claim 8, wherein the controller is configured to select, among the plurality of second terminals, another second terminal other than the at least one second terminal among the plurality of second terminals, the another second terminal existing in a distant area of the wireless communication device and being configured to determine a third frequency component allocated to the another second terminal, and the transmitter is configured to set a terminal identifier of the another second terminal in a field corresponding to the third frequency component, in the first header, the first physical packet includes a third frame addressed to the third terminal, and the transmitter is configured to transmit the third frame addressed to the third terminal, the terminal identifier of the another second terminal being set in a fourth field corresponding to the third frequency component, in the second header of the second physical packet.

10. The wireless communication system according to claim 6, further comprising at least one antenna.

11. A wireless communication device communicating with a second wireless communication device, a receiver configured to receive terminal identifiers of a plurality of first terminals being targets for uplink frequency multiplexing transmission from second wireless communication device, and configured to receive information identifying, among a plurality of frequency components, a plurality of first frequency components allocated to the plurality of first terminals, the first frequency components being different from each other;

a controller configured to determine a plurality of second frequency components allocated to a plurality of second terminals being targets for the uplink frequency multiplexing transmission, the second frequency components being different from each other; and a transmitter configured to transmit a first frame in a period at least partially overlapping with a period in which a second frame is transmitted from the second wireless communication device, the first frame instructing the uplink frequency multiplexing transmission, wherein the first frame includes the terminal identifiers of the plurality of first terminals which are set in a plurality of first fields corresponding to the plurality of first frequency components, and terminal identifiers of the plurality of second terminals which are set in a plurality of first fields corresponding to the plurality of second frequency components, and wherein a transmitter address of the first frame is an address of the second wireless communication device, and the second terminals are able to receive and interpret the first frame whose transmitter address is the address of the second wireless communication device, wherein the second wireless communication device is configured to transmit a second frame, the second frame including the terminal identifiers of the plurality of first terminals which are set in a plurality of second fields corresponding to the plurality of first frequency components, and terminal identifiers of the plurality of second terminals which are set in a plurality of second fields corresponding to the plurality of second frequency components.

12. The wireless communication device according to claim 11, further comprising at least one antenna.

13. A wireless communication device communicating with a second wireless communication device, comprising:

a receiver configured to receive information of a second frequency band used for transmission of a first frame by the second wireless communication device, the first frame instructing a plurality of first terminals to perform uplink frequency multiplexing transmission at a first frequency band including a plurality of frequency components, and specifying frequency components for the uplink frequency multiplexing transmission to the first terminals, a transmitter configured to transmit a second frame at a third frequency band different from the second frequency band, the second frame instructing a plurality of second terminals belonging to the wireless communication device to perform the uplink frequency multiplexing transmission at the first frequency band and the second frame specifying frequency components for the uplink frequency multiplexing transmission to the second terminals, the second frame being transmitted in a period at least overlapping with a period in which the first frame is transmitted, a frequency component specified for a first terminal existing in a distant area of the second wireless communication device is different from a frequency component specified for a second terminal in a distant area of the wireless communication device, and a frequency component specified for another first terminal existing in a neighbor area of the second wireless communication device is the same as a frequency component specified for another second terminal in a neighbor area of the wireless communication device.

14. The wireless communication system according to claim 13, further comprising at least one antenna.

* * * * *